US009684571B2

(12) United States Patent
Modukuri et al.

(10) Patent No.: US 9,684,571 B2
(45) Date of Patent: Jun. 20, 2017

(54) NAMESPACE MIRRORING IN AN EXPANDABLE STORAGE VOLUME

(71) Applicant: NetApp, Inc., Sunnyvale, CA (US)

(72) Inventors: Kiran Kumar Modukuri, Livermore, CA (US); Su Chen, Cupertino, CA (US)

(73) Assignee: NETAPP, INC., Sunnyvale, CA (US)

( * ) Notice: Subject to any disclaimer, the term of this patent is extended or adjusted under 35 U.S.C. 154(b) by 705 days.

(21) Appl. No.: 13/875,236

(22) Filed: May 1, 2013

(65) Prior Publication Data
US 2014/0330787 A1    Nov. 6, 2014

(51) Int. Cl.
*G06F 17/30* (2006.01)
*G06F 11/20* (2006.01)
*G06F 11/14* (2006.01)

(52) U.S. Cl.
CPC .......... *G06F 11/20* (2013.01); *G06F 11/1435* (2013.01)

(58) Field of Classification Search
None
See application file for complete search history.

(56) References Cited

U.S. PATENT DOCUMENTS

| 7,533,235 B1 * | 5/2009 | Hamilton | G06F 3/0608 707/999.1 |
| 8,805,967 B2 * | 8/2014 | Taylor | G06F 11/2005 709/219 |
| 2007/0016822 A1 * | 1/2007 | Rao | G06F 9/5061 714/4.11 |
| 2007/0185938 A1 * | 8/2007 | Prahlad | G06F 17/30212 |
| 2008/0104144 A1 * | 5/2008 | Rajan | G06F 3/0607 |
| 2009/0006888 A1 * | 1/2009 | Bernhard | G06F 11/08 714/6.12 |
| 2009/0106255 A1 * | 4/2009 | Lacapra | G06F 11/1076 |
| 2014/0074787 A1 * | 3/2014 | Berman | G06F 11/1451 707/639 |

\* cited by examiner

*Primary Examiner* — Jay Morrison
(74) *Attorney, Agent, or Firm* — Gilliam IP PLLC

(57) ABSTRACT

Technology for maintaining a backup of namespace metadata of an expandable storage volume is disclosed. In various embodiments, the expandable storage volume backs up metadata of a namespace constituent volume of the expandable storage volume into a namespace mirror volume. The namespace constituent volume is responsible for storing the metadata for data objects stored in multiple data constituent volumes of the expandable storage volume. In response to a signal indicating that the namespace constituent volume is unavailable, the namespace mirror volume replaces the role of the namespace constituent volume. The new namespace constituent volume continues to provide metadata for a data object of the data objects in response to an operation request for the data object.

20 Claims, 17 Drawing Sheets

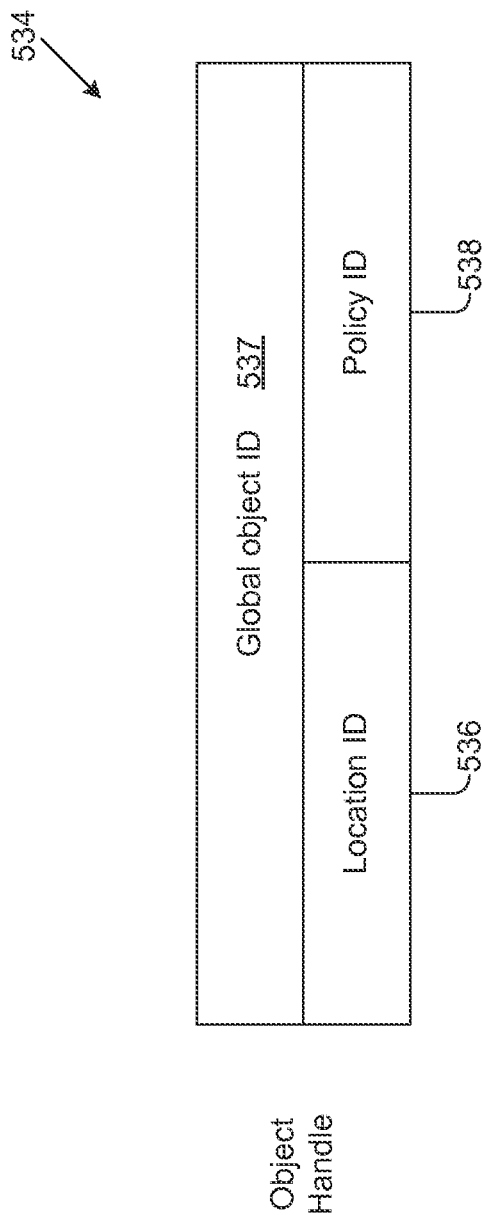

NAMESPACE MIRRORING IN AN EXPANDABLE STORAGE VOLUME

BACKGROUND

In storage technology, a storage server is a processing system that provides one or more storage clients with access (e.g., read and write access) to a mass storage facility over a network. Such a system is called a network storage system. In other words, a storage server is adapted to store and retrieve data on behalf of one or more client processing systems ("clients" or "hosts") in response to requests received from the hosts. At least some storage servers can provide clients with both file-level access and block-level access to data stored in storage devices (e.g., disks, solid-state drives, etc.). For convenience, a storage server will be described herein, for the most part, in terms of storage devices that provide file-level access, although the description herein also has application to storage systems that provide block-level access, as will be apparent to those of ordinary skill in the art. Examples of such storage servers include a file server or another type of computing device that provides storage services using a file system to respond to file-oriented data access requests ("filer"). A storage server includes a storage operating system that implements a file system to logically organize the information as a hierarchical structure of directories and files on the storage devices. A "file system" as discussed herein is a structured set of logical containers of data, which may be, but are not necessarily, in the form of files, directories, logical units and/or other type(s) of logical containers. Each file stored on a disk or other type of storage device may be implemented as a set of data structures, e.g., disk blocks, that are configured to store information.

A disk-based storage for a storage server typically has one or more storage volumes. A "volume" is a logical data set which is an abstraction of physical storage, combining one or more physical mass storage devices (e.g., disks, solid-state drives, etc.) or parts thereof into a single logical storage object, and which is managed as a single administrative unit, e.g., a single file system. A volume may be defined from a larger group of available storage, e.g., an aggregate, and may be logically broken down into logical data sets (storage objects) called "plexes", which may contain one or more RAID groups. An aggregate is a logical aggregation of physical storage; e.g., a logical container for a pool of storage, combining one or more physical mass storage devices or parts thereof into a single logical storage object, which contains or provides storage for one or more other logical data sets at a higher level of abstraction (e.g., volumes).

The file systems of the volumes maintained by a storage server can form a single shared namespace. A "namespace" as discussed herein is a logical grouping of unique identifiers of a set of logical containers of data, e.g., volumes. A storage server can include a namespace table for storing metadata (e.g. file name, directory information and file attributes) for the files stored within the files systems under the single shared namespace. A namespace table provides a single access point (and typically the only way to access) to the critical metadata for all files stored in the storage server. If the namespace table fails or becomes corrupted for any reason, the storage server can no longer provide any data service for the data files that it maintains.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

FIG. 5C is a block diagram illustrating a multilevel object handle, in which the technology can be implemented in various embodiments.

DETAILED DESCRIPTION

Figure 1:
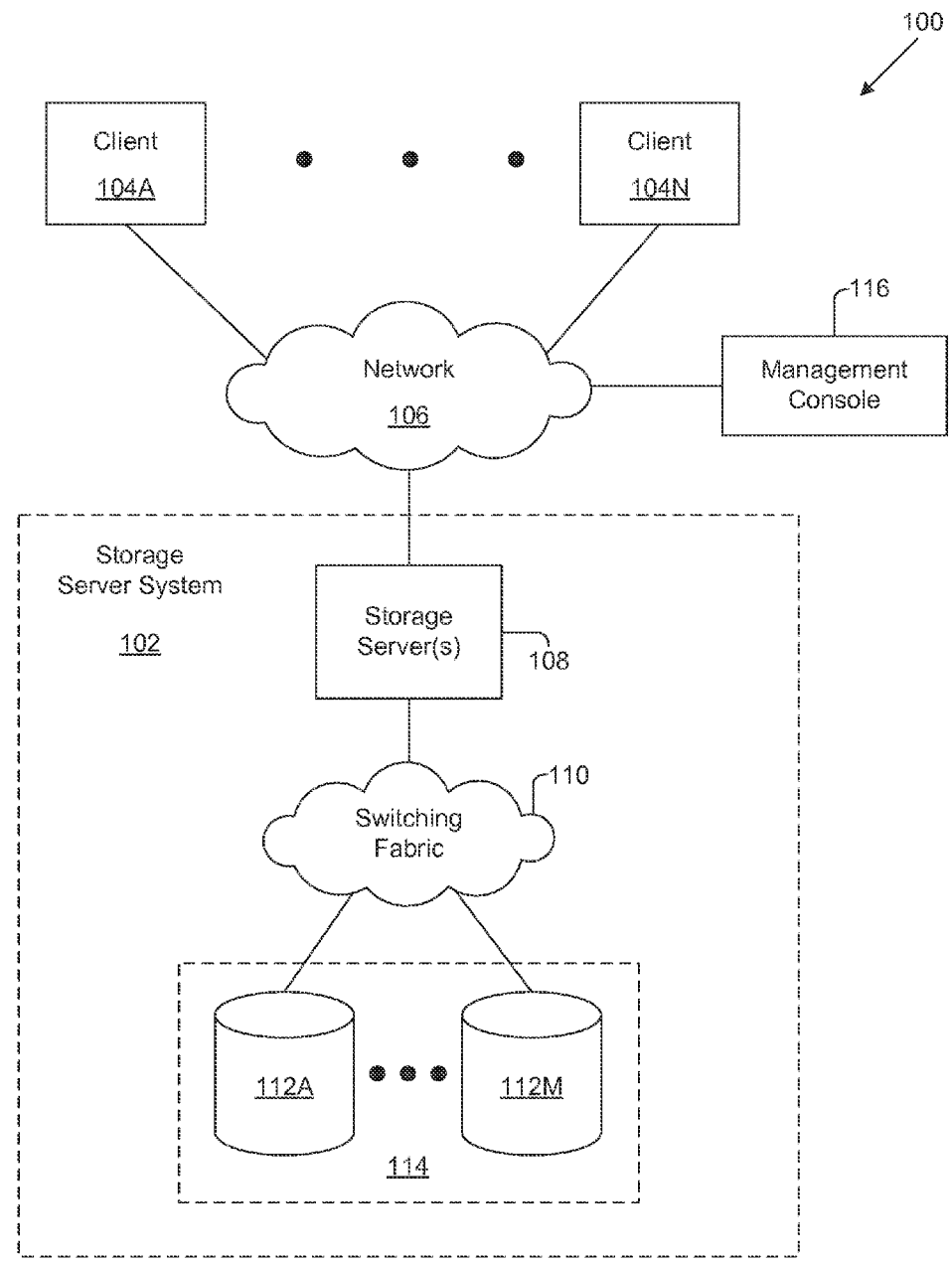
FIG. 1 is a block diagram illustrating a network storage environment, in which the technology can be implemented in various embodiments.

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment or all embodiments, however.

Technology for providing a namespace mirror for the namespace constituent volume of an expandable storage volume is disclosed herein ("the technology"). The technology protects against corruption or inaccessibility of namespace metadata.

An expandable storage volume is a scalable storage volume including multiple flexible volumes. A "namespace" as discussed herein is a logical grouping of unique identifiers for a set of logical containers of data, e.g., volumes. A flexible volume is a volume whose boundaries are flexibly associated with the underlying physical storage (e.g., aggregate). The namespace constituent volume stores the metadata (e.g. inode files) for the data objects in the expandable storage volume. Various metadata are collected into this single namespace constituent volume. To protect the expandable storage volume from a single point of failure of the namespace constituent volume, a namespace mirror synchronizes with the namespace constituent volume and serves as a backup for the metadata in the namespace constituent volume. When the namespace constituent volume is not available for maintaining and providing the metadata, the namespace mirror replaces the role of the unavailable namespace constituent volume. As a result, the expandable storage volume can continue servicing data requests by accessing data objects metadata (e.g. the inode files) from the namespace mirror.

In various embodiments, the technology discloses an expandable storage volume including a namespace mirror. The expandable storage volume includes a namespace constituent volume, a namespace mirror volume, and multiple data constituent volumes. The expandable storage volume backs up metadata of the namespace constituent volume of the expandable storage volume into the namespace mirror volume. The namespace constituent volume is responsible for storing the metadata for data objects stored in the data constituent volumes of the expandable storage volume. In response to a signal indicating that the namespace constituent volume is unavailable, the namespace mirror volume replaces the role of the namespace constituent volume. The new namespace constituent volume (e.g., the namespace mirror volume) continues to provide metadata for a data object of the data objects in response to an operation request for the data object.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

System Environment

Figure 2:
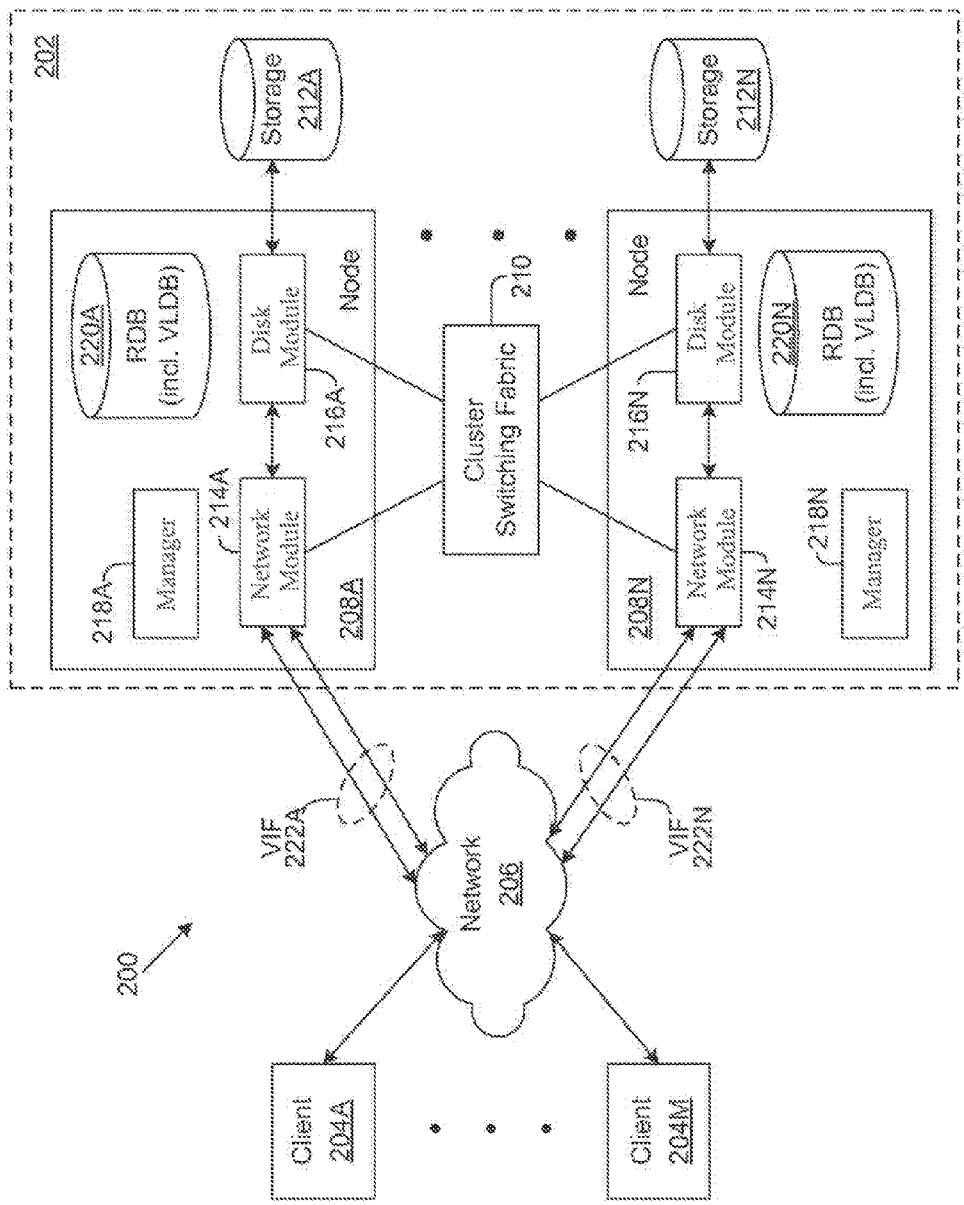
FIG. 2 is a block diagram illustrating a clustered network storage environment, in which the technology can be implemented in various embodiments.

Turning now to the Figures, FIGS. 1 and 2 illustrate, at different levels of detail, storage environment configurations in which the technology can be implemented. Client computing devices ("clients") are presented with a clustered storage system having multiple storage volumes that can be managed by multiple nodes. The storage volumes form an expandable storage volume. The technology provides a disaster recovery solution for synchronizing and backing up the metadata of data objects within the expandable storage volume.

Referring to FIG. 1, FIG. 1 is a block diagram illustrating a network storage environment 100, in which the technology can be implemented in various embodiments. The storage environment 100 includes multiple client computing devices or systems 104A-104N, a storage server system 102, and a network 106 connecting the client systems 104A-104N and the storage server system 102. As illustrated in FIG. 1, the storage server system 102 includes at least one storage server 108, a switching fabric 110, and a number of mass storage devices 112A-112M within a mass storage subsystem 114, e.g., conventional magnetic disks, optical disks such as CD-ROM or DVD based storage, magneto-optical (MO) storage, flash memory storage device or any other type of non-volatile storage devices suitable for storing structured or unstructured data. The examples disclosed herein may reference a storage device as a "disk" but the adaptive embodiments disclosed herein are not limited to disks or any particular type of storage media/device, in the mass storage subsystem 114.

The storage server (or servers) 108 may be, for example, one of the storage server products available from NetApp, Inc., the assignee of the present application, or available from other vendors. The client systems 104A-104N may access the storage server 108 via network 106, which can be a packet-switched network, for example, a local area network (LAN), wide area network (WAN) or any other type of network.

The storage server 108 maybe connected to the storage devices 112A-112M via the switching fabric 110, which can be a fiber distributed data interface (FDDI) network, for example. It is noted that, within the network data storage environment, any other suitable numbers of storage servers and/or mass storage devices, and/or any other suitable network technologies, may be employed. While the embodiment illustrated in FIG. 1 suggests, a fully connected switching fabric 110 where storage servers can access all storage devices, it is understood that such a connected topology is not required. In various embodiments, the storage devices can be directly connected to the storage servers such that two storage servers cannot both access a particular storage device concurrently.

The storage server 108 can make some or all of the storage space on the storage devices 112A-112M available to the client systems 104A-104N in a conventional manner. For example, a storage device (one of 112A-112M) can be implemented as an individual disk, multiple disks (e.g., a RAID group) or any other suitable mass storage device(s). The storage server 108 can communicate with the client systems 104A-104N according to well-known protocols, e.g., the Network File System (NFS) protocol or the Common Internet File System (CIFS) protocol, to make data stored at storage devices 112A-112M available to users and/or application programs.

The storage server 108 can present or export data stored at storage device 112A-112M as volumes (also referred to herein as storage volumes) to one or more of the client systems 104A-104N. On or more volumes can be managed as a single file system. In various embodiments, a "file system" does not have to include or be based on "files" per se as its units of data storage.

Various functions and configuration settings of the storage server 108 and the mass storage subsystem 114 can be controlled from a management console 116 coupled to the network 106.

FIG. 2 is a block diagram illustrating a clustered network storage environment, in which the technology can be implemented in various embodiments. As illustrated in FIG. 2, a cluster based storage environment 200 includes multiple server nodes. In the cluster based storage environment 200, clients may be presented with an expandable storage volume (for example, an expandable storage volume 600 described below with respect to FIG. 6A) having multiple storage volumes that are managed by different server nodes. The various storage volumes are replicated using the technology described below in detail.

The storage environment 200 includes multiple client systems 204 (204A-204M), a clustered storage system 202, and a network 206 connecting the client systems 204 and the clustered storage server system 202. As illustrated in FIG. 2, the clustered storage server system 202 includes multiple server nodes (may also be referred to as "nodes") 208A-208N, a cluster switching fabric 210, and multiple mass storage devices 212 (212A-212N), similar to storage devices 112A-112M (FIG. 1). In various embodiments, more than one mass storage device 212 can be associated with one of the nodes 208A-208N.

The nodes 208A-208N can be configured to include several modules, including an network module 214, a disk module 216, and an a manager 218 (each of which can be implemented by using a separate processor executable module) and an instance of a replicated database (RDB) 220. In the illustrated embodiment, node 208A includes an network module 214A, a disk module 216A, and a manager 218A; node 208N includes an network module 214N, a disk module 216N, and a manager 218N; and so forth. The network modules 214A-214N include functionality that enables nodes 208A-208N, respectively, to connect to one or more of the client systems 204 over the network 206, while the disk modules 216A-216N provide access to the data stored at storage devices 212A-212N, respectively. The managers 218 provide management functions for the clustered storage server system 202 including generating snapshots of the volumes. Accordingly, the server nodes 208A-208N in the clustered storage server arrangement can provide the functionality of a storage server.

In various embodiments, RDBs 220A-220N are instances of a database that is replicated throughout the cluster, e.g., nodes 208A-208N can include instances of the RDBs 220A-220N. The various instances of the RDBs 220A-220N are updated regularly to bring them into synchronization with each other. The RDBs 220A-220N can provide cluster-wide storage for information used by nodes 208A-208N, including a volume location database (VLDB) (not illustrated). The VLDB is a database that indicates the location within the cluster of volumes in the cluster (e.g., the owning disk module for a corresponding volume) and is used by the network modules (one of 214A-214N) to identify the appropriate disk module (one of 216A-216N) for any given volume to which access is requested.

A switched virtualization layer including multiple virtual interfaces (VIFs) 222A-222N is provided between the respective network modules 214A-214N and the client systems 204A-204M, allowing the storage 212A-212N associated with the nodes 208A-208N to be presented to the client systems as a single shared storage pool.

The clustered storage system 202 can be organized into any suitable number of virtual servers (also referred to as "vservers"), in which one or more vservers represent a single storage system namespace with separate network access. In various embodiments, each vserver has a user domain and a security domain that are separate from the user and security domains of other vservers. In some other embodiments, two or more vservers can a common user domain and a common security domain. Moreover, a vserver can be associated with one or more VIFs 222A-222N and can span one or more physical nodes, each of which can hold one or more VIFs 222A-222N and storage associated with one or more vservers. Client systems can access the data on a vserver from any node of the clustered system, but generally access vservers via the VIFs 222A-222N associated with that vserver. It is noteworthy that the embodiments described herein are not limited to the use of vservers.

The nodes 208A-208N are interconnected by a cluster switching fabric 210, that can be embodied as a Gigabit Ethernet switch, for example. The network modules 214 and disk modules 216 cooperate to provide highly-scalable, distributed storage system architecture of a clustered computing environment implementing various embodiments of the technology. Although an equal number of network modules and disk modules are illustrated in FIG. 2, there may be different numbers of network modules and/or disk modules in accordance with various embodiments of the technology described here. For example, there need not be a one-to-one correspondence between the network modules and disk modules. As such, the description of a node 208A-208N comprising one network module and one disk module should be understood to be illustrative only.

Figure 3:
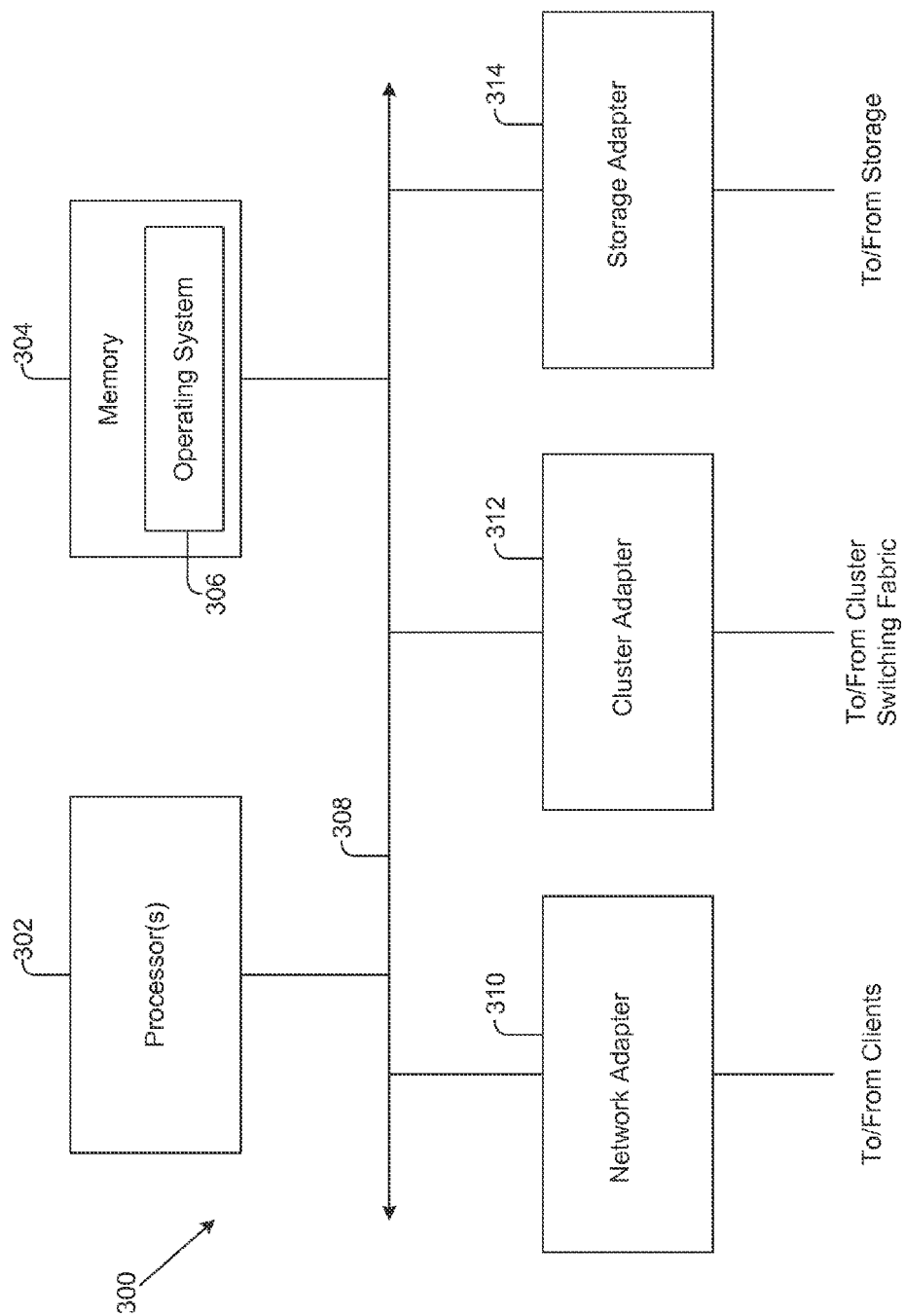
FIG. 3 is a high-level block diagram illustrating an example of hardware architecture of a storage controller that can implement one or more storage server nodes, in various embodiments.

FIG. 3 is a high-level block diagram illustrating an example of a hardware architecture of a storage controller 300 that can implement one or more storage server nodes 208A-208N, in various embodiments. The storage controller 300 executes some or all of the processor executable process steps that are described below in detail. In various embodiments, the storage controller 300 includes a processor subsystem that includes one or more processors 302. Processor 302 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The storage controller 300 can further include a memory 304, a network adapter 310, a cluster access adapter 312 and a storage adapter 314, all interconnected by an interconnect 308. Interconnect 308 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other system.

The cluster access adapter 312 includes multiple ports adapted to couple the storage controller 300 to other nodes of a cluster. In the illustrated embodiment, Ethernet can be used as the clustering protocol and interconnect media, although other types of protocols and interconnects may be utilized within the cluster architecture described herein. In various alternative embodiments where the N-modules and D-modules are implemented on separate storage systems or computers, the cluster access adapter 312 can be utilized by the N-module and/or D-module for communicating with other N-modules and/or D-modules of the cluster.

The storage controller 300 can be embodied as a single- or multi-processor storage system executing a storage operating system 306 that can implement a high-level module, e.g., a storage manager, to logically organize the information as a hierarchical structure of named directories, files and special types of files called virtual disks (hereinafter generally "blocks") at the storage devices. For example, one processor 302 can execute the functions of an N-module on a node while another processor 302 executes the functions of a D-module on the node.

The memory 304 can comprise storage locations that are addressable by the processor(s) 302 and adapters 310, 312, and 314 for storing processor executable code and data structures. The processor 302 and adapters 310, 312, and 314 may, in turn, comprise processing elements and/or logic circuitry configured to execute the software code and manipulate the data structures. The storage operating system 306, portions of which is typically resident in memory and executed by the processors(s) 302, functionally organizes the storage controller 300 by (among other things) configuring the processor(s) 302 to invoke storage operations in support of the storage service provided by a node. It will be apparent to those skilled in the art that other processing and memory implementations, including various computer readable storage media, may be used for storing and executing program instructions pertaining to the technology.

The network adapter 310 can include multiple ports to couple the storage controller 300 to one or more clients over point-to-point links, wide area networks, virtual private networks implemented over a public network (Internet) or a shared local area network. The network adapter 310 thus can include the mechanical, electrical and signaling circuitry needed to connect the storage controller 300 to the network. Illustratively, the network can be embodied as an Ethernet network or a Fibre Channel (FC) network. A client can communicate with a node over the network by exchanging discrete frames or packets of data according to pre-defined protocols, e.g., TCP/IP.

The storage adapter 314 can cooperate with the storage operating system 306 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. For example, as illustrated in FIG. 3, the information can be stored on storage devices 212. The storage adapter 314 can include multiple ports having input/output (I/O) interface circuitry that couples to the disks over an I/O interconnect arrangement, e.g., a conventional high-performance, Fibre Channel (FC) link topology.

Storage of information on storage devices 212 can be implemented as one or more storage volumes that include a collection of physical storage disks cooperating to define an overall logical arrangement of volume block number (VBN) space on the volume(s). The storage devices 212 can be organized as a RAID group. One or more RAID groups can form an aggregate. An aggregate can contain one or more volumes and/or file systems.

Figure 4:
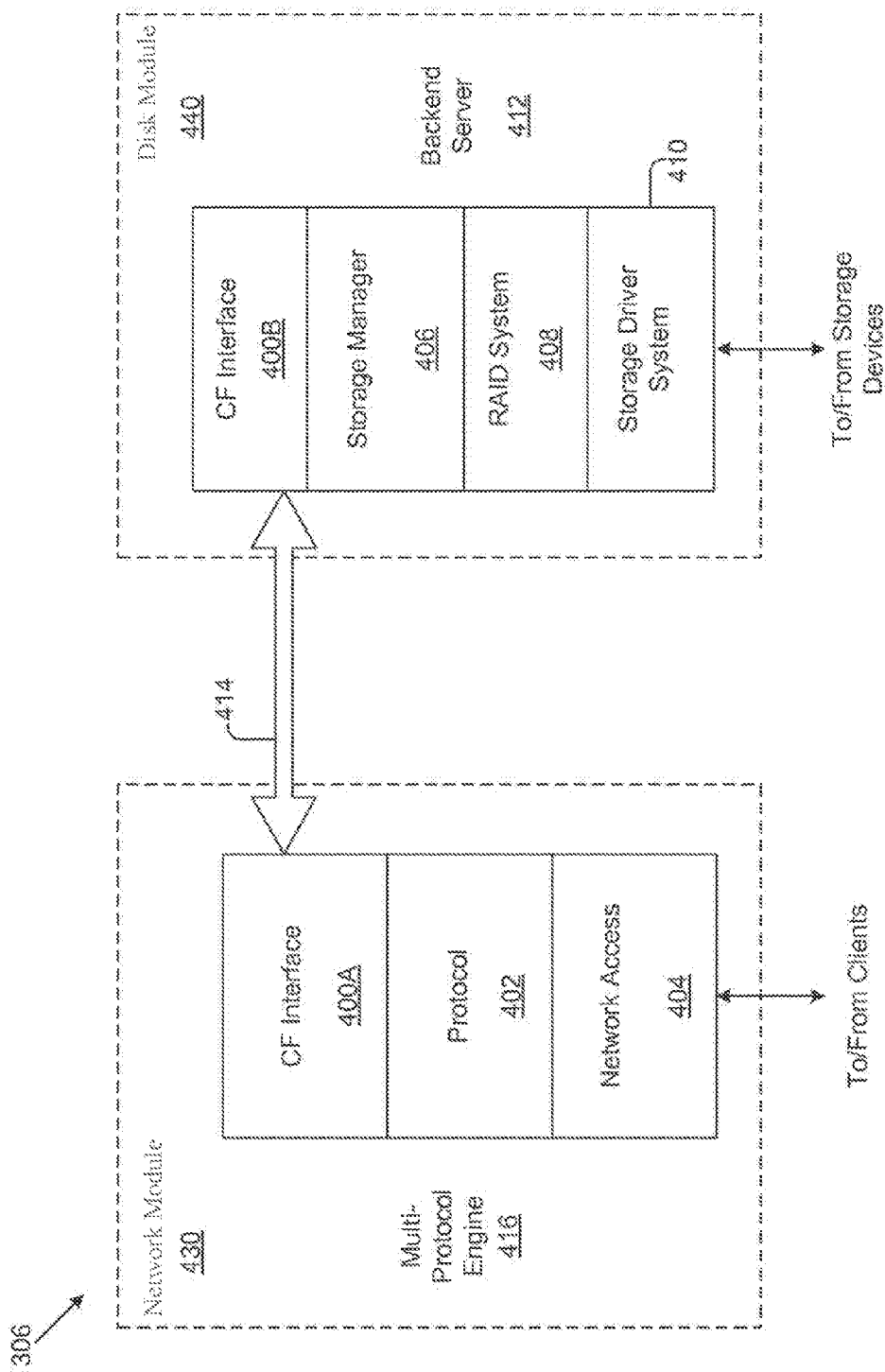
FIG. 4 is a block diagram illustrating an example of a storage operating system of a storage server node, in which the technology can be implemented in various embodiments.

The storage operating system 306 facilitates clients' access to data stored on the storage devices. In various embodiments, the storage operating system 306 implements a write-anywhere file system that cooperates with one or more virtualization modules to "virtualize" the storage space provided by storage devices. For example, a storage manager (e.g. as illustrated in FIG. 4) can logically organize the information as a hierarchical structure of named directories and files on the storage devices. An "on-disk" file may be implemented as set of disk blocks configured to store information, e.g., data, whereas the directory may be implemented as a specially formatted file in which names and links to other files and directories are stored. The virtualization module(s) allow the storage manager to further logically organize information as a hierarchical structure of blocks on the disks that are exported as named logical unit numbers (LUNs). In various embodiments, the storage manager of the storage operating system 306 can implement a file system using write anywhere file layout technology.

FIG. 4 is a block diagram illustrating an example of a storage operating system 306 of a storage server node, in which the technology can be implemented in various embodiments. The storage operating system 306 may be used to maintain various data structures for replicating storage volumes and providing access to replicated storage volumes.

In the illustrated embodiment, the storage operating system 306 includes multiple functional layers organized to form an integrated network protocol stack or, more generally, a multi-protocol engine 416 that provides data paths for clients to access information stored on the node using block and file access protocols. The multi-protocol engine 416 in combination with underlying processing hardware also forms an network module 430. The multi-protocol engine 416 includes a network access layer 404 that includes one or more network drivers that implement one or more lower-level protocols to enable the processing system to communicate over the network 206, e.g., Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 416 can also include a protocol layer 402 that implements various higher-level network protocols, e.g., NFS, CIFS, Hypertext Transfer Protocol (HTTP), Internet small computer system interface (iSCSI), etc. Further, the multiprotocol engine 416 can include a cluster fabric (CF) interface module 400A that implements intra-cluster communication with other disk modules and/or network modules.

In addition, the storage operating system 306 includes a set of layers organized to form a backend server 412 that provides data paths for accessing information stored on the storage devices of the nodes. The backend server 412 in combination with underlying processing hardware also forms a disk module 440. To that end, the backend server 412 includes a storage manager module 406 that can manage a number of storage volumes, a RAID system module 408 and a storage driver system module 410.

The storage manager 406 can manage a file system (or multiple file systems) and serve client-initiated read and write requests. The RAID system 408 manages the storage and retrieval of information to and from the volumes/disks in accordance with a RAID redundancy protocol, e.g., RAID-4, RAID-5, or RAID-DP, while the storage driver system 410 implements a disk access protocol e.g., SCSI protocol or FCP.

The backend server 412 also includes a CF interface module 400B to implement intra-cluster communication 414 with other network modules and/or disk modules. In various embodiments, the CF interface modules 400A and 400B can cooperate to provide a single file system image across the disk modules in the cluster. Thus, a network port of an network module that receives a client request can access any data container within the single file system image located on any disk module of the cluster.

The CF interface modules 400A and 400B implement the CF protocol to communicate file system commands among the modules of cluster over the cluster switching fabric (e.g. 210 in FIG. 2). Such communication can be effected by a disk module exposing a CF application programming interface (API) to which an network module (or another disk module) issues calls. To that end, a CF interface module can be organized as a CF encoder/decoder. The CF encoder of, e.g., CF interface 400A on network module 430 can encapsulate a CF message as (i) a local procedure call (LPC) when communicating a file system command to a disk module 440 residing on the same node or (ii) a remote procedure call (RPC) when communicating the command to a disk module residing on a remote node of the cluster. The CF decoder of CF interface 400B on disk module 440 can de-encapsulate the CF message and process the file system command.

In operation of a node, a request from a client can be forwarded as a packet over a network and onto the node, where it is received at the network adapter (e.g. 310 in FIG. 3). A network driver of layer 404 processes the packet and, if appropriate, passes it on to a network protocol and file access layer for additional processing prior to forwarding to the storage manager 406. The storage manager 406 can then generate operations to load (e.g. retrieve) the requested data from storage device if it is not resident in memory of the node. If the information is not in the memory, the storage manager 406 can index into a metadata file to access an appropriate entry and retrieve a logical virtual block number (VBN). The storage manager 406 can then pass a message structure including the logical VBN to the RAID system 408; the logical VBN can then be mapped to a disk identifier and disk block number (DBN) and sent to an appropriate driver (e.g., SCSI) of the storage driver system 410. The storage driver can access the DBN from the specified storage device 212 and loads the requested data block(s) in memory for processing by the node. Upon completion of the request, the node (and operating system) can return a reply to the client over the network.

The data request/response "path" through the storage operating system 306 as described above can be implemented in general-purpose programmable hardware executing the storage operating system 306 as software or firmware. Alternatively, it can be implemented at least partially in specially designed hardware. That is, in an alternate embodiment of the technology, some or all of the storage operating system 306 is implemented as logic circuitry embodied within a field programmable gate array (FPGA) or an application specific integrated circuit (ASIC), for example.

The network module 430 and disk module 440 can be implemented as processing hardware configured by separately-scheduled processes of storage operating system 306; however, in an alternate embodiment, the modules may be implemented as processing hardware configured by code within a single operating system process. Communication between an network module 430 and a disk module 440 can thus be effected through the use of message passing between the modules although, in the case of remote communication between an network module and disk module of different nodes, such message passing occurs over a cluster switching fabric. The message-passing mechanism provided by the storage operating system to transfer information between modules (processes) can be the Inter Process Communication (IPC) mechanism. The protocol used with the IPC mechanism is illustratively a generic file and/or block-based "agnostic" CF protocol that comprises a collection of methods/functions constituting a CF API.

Architecture of Storage System Including Data Constituent Volumes

Figure 5A:
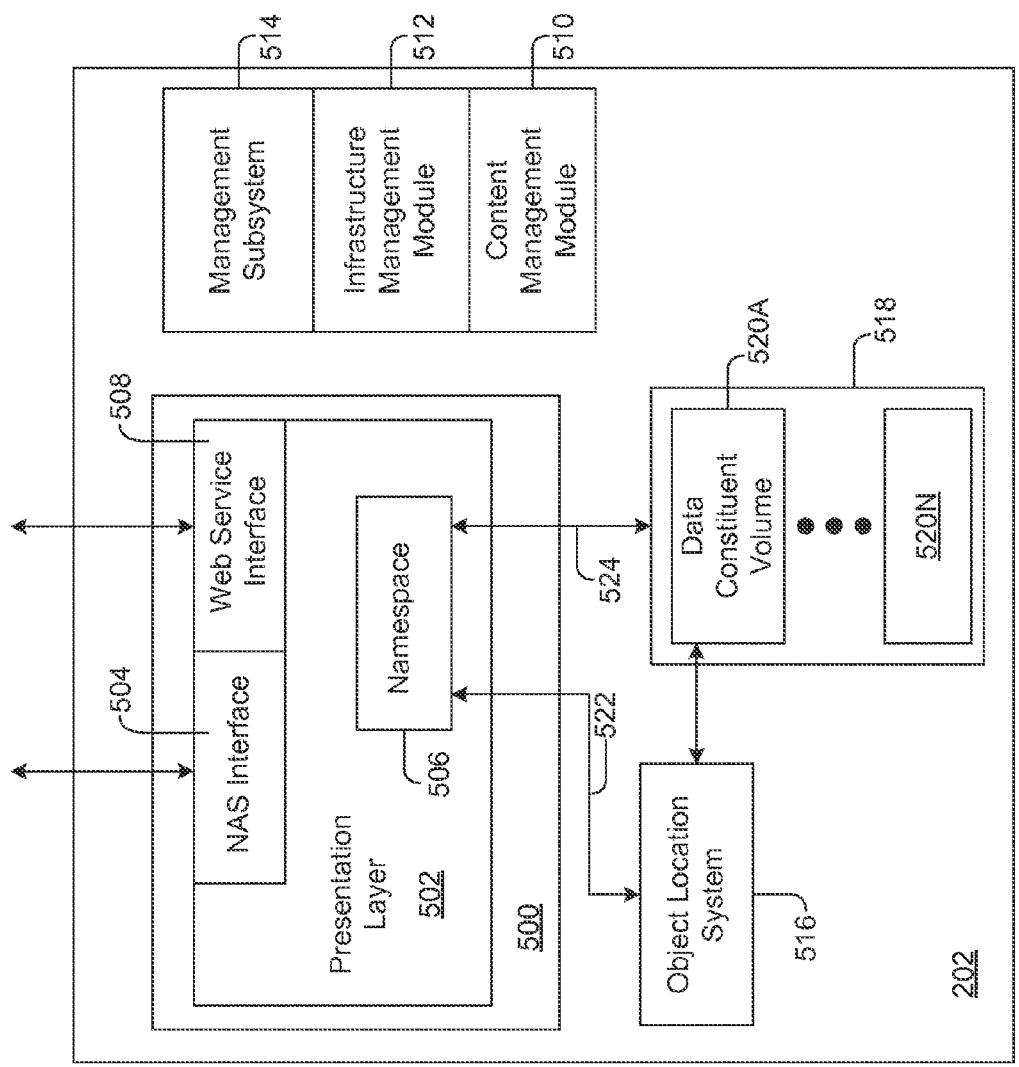
FIG. 5A is a block diagram illustrating an overall architecture of a content repository, in which the technology can be implemented in various embodiments.

The technology generally relates to a content repository implemented in a network storage server system such as described above. FIG. 5A is a block diagram illustrating an overall architecture of a content repository, in which the technology can be implemented in various embodiments. The content repository includes a distributed object store 518, an object location subsystem (OLS) 516, a presentation layer 502, and a management subsystem 514. In various embodiments, there can be instances of these components in the overall content repository, and each of these components can be implemented in any one server node or distributed across two or more server nodes. The functional elements of these units (e.g., the OLS 516, presentation layer 502 and management subsystem 514) can be implemented by specially designed circuitry, or by programmable circuitry programmed with software and/or firmware, or a combination thereof. The data storage elements of these units can be implemented using any known or convenient form or forms of data storage device.

The distributed object store 518 provides the actual data storage for the data objects in the server system 202 and can include one or more data constituent volumes (which may interchangeably be referred to as distinct single-node object stores 520A-520N). A "single-node" object store or data constituent volume is an object store that is implemented entirely within one node. The data constituent volume can be a logical (non-physical) container of data, e.g., a data constituent volume or a logical unit (LUN). Some or all of the data constituent volumes 520A-520N that make up the distributed object store 518 can be implemented in separate server nodes. Alternatively, all of the data constituent volumes 520A-520N that make up the distributed object store 518 can be implemented in the same server node. Any given server node can access multiple data constituent volumes 520A-520N and can include multiple data constituent volumes 520A-520N.

The distributed object store 518 provides location-independent addressing of data objects (e.g., data objects can be moved among data constituent volumes 520A-520N without changing the data objects' addressing), with the ability to span the object address space across other similar systems spread over geographic distances. In various embodiments, the distributed object store 518 can have no namespace. In such a case, the namespace for the server system 202 can be provided by the presentation layer 502.

The term "namespace" as used herein refers to a virtual hierarchical collection of unique volume names or identifiers and directory paths to the volumes, in which a volume represents a virtualized container storing a portion of the namespace descending from a single root directory. For example, a volume associated with a namespace can be configured to store one or more data containers, scripts, word processing documents, executable programs and others.

The presentation layer 502 provides access to the distributed object store 518. It is generated by at least one presentation module 500 (it may also be generated collectively by multiple presentation modules). The presentation module 500 can be in the form of specially designed circuitry, or programmable circuitry programmed with software and/or firmware, or a combination thereof.

The presentation layer 502 can receive client requests, translate them into an internal protocol and send them to the appropriate disk module 440. The presentation layer 502 can provide two or more independent interfaces for accessing stored data, e.g., a conventional NAS interface 504 and a Web Service interface 508. The NAS interface 504 can provide access to the object store 518 via one or more conventional NAS protocols, e.g., NFS and/or CIFS. Thus, the NAS interface 504 provides a file system-like interface to the content repository.

The Web Service interface 508 can provide access to data stored in the object store 518 via either "named object access" or "raw object access" (also called "flat object access"). Named object access uses a namespace (e.g., a file system-like directory-tree interface for accessing data objects), as does NAS access; whereas raw object access uses system-generated global object IDs to access data objects, as described further below. The Web Service interface 508 can provide access to the object store 518 via Web Service (as defined by the W3C), using for example, a protocol, e.g., Simple Object Access Protocol (SOAP) or a RESTful (Representational State Transfer) protocol, over HTTP.

The presentation layer 502 can further provide at least one namespace 506 (may also be referred to as namespace volume) for accessing data via the NAS interface or the Web Service interface. In various embodiments, the namespace 506 can include a Portable Operating System Interface (POSIX) namespace or other types of namespace. The NAS interface 504 allows access to data stored in the object store 518 via the namespace(s) 506. The Web Service interface 508 can provide access to data stored in the object store 518 via either the namespace(s) 506 (e.g. by using named object access) or without using the namespace(s) 506 (e.g. by using "raw object access"). Thus, the Web Service interface 508 can provide either named object access or raw object access. Access by the presentation layer 502 to the object store 518 can be via either a "fast path" 524 or a "slow path" 522, as discussed in further detail below.

OLS 516 can store and provide valid location IDs (and other information, e.g., policy IDs) of data objects, based on their global object IDs (these parameters are discussed further below). This is done, for example, in response to a client 204 request to access a data object by using the global object ID instead of a complete object handle including the location ID, or when the location ID within an object handle is no longer valid (e.g., because the target data object has been moved). In various embodiments, the system 202 thereby provides two distinct paths for accessing stored data, namely, the fast path 524 and the slow path 522. The fast path 524 provides data access when a valid location ID is provided by a client 204 (e.g., within an object handle). The slow path 522 makes use of the OLS and is used in all other instances of data access. The fast path 524 is so named because a target data object can be located directly from its (valid) location ID, whereas the slow path 522 is so named because it requires a number of additional steps (relative to the fast path) to determine the location of the target data object.

The management subsystem 514 can include a content management component 510 and an infrastructure management component 512. The infrastructure management component 512 can include logic to allow an administrative user to manage the storage infrastructure (e.g., configuration of nodes, storage devices, volumes, LUNs, etc.). The content management component 510 can be a policy based data management subsystem for managing the lifecycle of data objects (and optionally the metadata) stored in the content repository, based on user-specified policies. It can execute actions to enforce defined policies in response to system-defined trigger events and/or user-defined trigger events (e.g., attempted creation, deletion, access or migration of an object).

The specified policies may relate to, for example, system performance, data protection and data security. Performance related policies may relate to, for example, which logical container a given data object should be placed in, migrated from or to, when the data object should be migrated or deleted, etc. Data protection policies may relate to, for example, data backup and/or data deletion. Data security policies may relate to, for example, when and how data should be encrypted, who has access to particular data, etc. The specified policies can also include polices for power management, storage efficiency, data retention, and deletion criteria. The policies can be specified in any known format and method. A "policy" in this context is not necessarily an explicit specification by a user of where to store what data, when to move data, etc. Rather, a "policy" can be a set of specific rules regarding where to store data, when to migrate data, etc., derived by the system from the end user's SLOs, e.g., a more general specification of the end user's expected performance, data protection, security, etc. For example, an administrative user might simply specify a range of performance that can be tolerated with respect to a particular parameter and in response the management subsystem 514 would identify the appropriate data objects that need to be migrated, where they should get migrated to, and how quickly they need to be migrated.

Figure 5B:
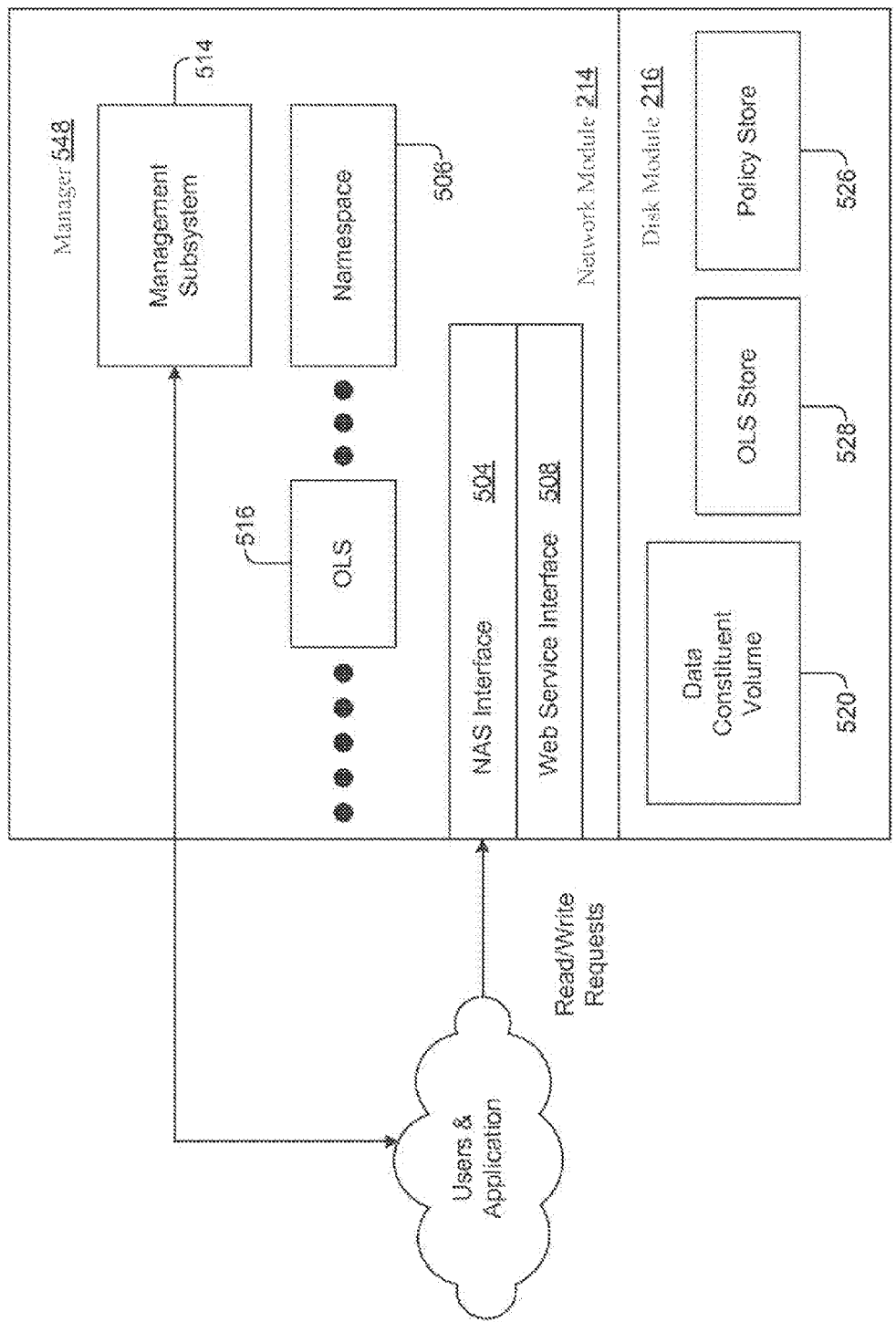
FIG. 5B is a block diagram illustrating a content repository that can be implemented in the clustered architecture illustrated in any of FIG. 2 through 4, in various embodiments.

FIG. 5B is a block diagram illustrating a content repository that can be implemented in the clustered architecture illustrated in any of FIGS. 2 through 4, in various embodiments. Although FIG. 5B illustrates the system relative to a single server node, it will be recognized by a person having ordinary skill in the art that the configuration illustrated in FIG. 5B actually can be implemented by two or more (or all) of the server nodes in a cluster.

In various embodiments, the distributed object store 518 can be implemented by providing at least one data constituent volume 520 in at least two disk modules 440 in the system (any given disk module 440 can include zero or more single node object stores 520). Also implemented in at least two disk modules 440 in the system are: an OLS store 528 that contains mapping data structures used by the OLS 516 including valid location IDs and policy IDs; and a policy store 526 (e.g., a database) that contains user-specified policies relating to data objects. In various embodiments, at least some policies or policy information may also be cached in the network module 430 to improve performance.

The presentation layer 502 is implemented at least partially within an N-network module 430. In various embodiments, the OLS 516 is implemented partially by the network module 430 and partially by a corresponding manager 548, as illustrated in FIG. 5B. For example, the functions of the OLS 516 can be implemented by a special daemon in the manager 548 and by the presentation layer 502 in the network module 430.

In various embodiments, the management subsystem 514 can be implemented at least partially within manager 548. In some other embodiments, any of these subsystems may also be implemented at least partially within other modules. For example, at least a portion of the content management component 510 of the management subsystem 514 can be implemented within one or more network modules to allow, for example, caching of policies in such network modules and/or execution/application of policies by such network module(s). In that case, the processing logic and state information for executing/applying policies may be contained in one or more network modules, while processing logic and state information for managing policies is stored in one or more managers. Administrative users can specify policies for use by the management subsystem 514, via a user interface provided by the manager 548 to access the management subsystem 514.

As noted above, the distributed object store enables both path-based access to data objects as well as direct access to data objects. For purposes of direct access, the distributed object store uses a multilevel object handle, as illustrated in FIG. 5C. FIG. 5C is a block diagram illustrating a multilevel object handle, in which the technology can be implemented in various embodiments. When a client creates a data object, it receives an object handle 534 as the response to creating the object. The object handle 534 is similar to a file handle that is returned when a file is created in a traditional storage system. The first level of the object handle is a system-generated globally unique number, called a global object ID 537 that is permanently attached to the created data object. The second level of the object handle is a "hint" that includes the location ID 536 of the data object and, in the illustrated embodiment, the policy ID 538 of the data object. Clients can store this object handle 534, containing the global object ID 537, location ID 536 and policy ID 538.

When a client attempts to read or write the data object using the direct access approach, the client includes the object handle of the object in its read or write request to the server system. The server system can first attempt to use the location ID (within the object handle), which is intended to be a pointer to the exact location within a volume where the data object is stored. If this operation succeeds, the object is read or written. This sequence is the "fast path" 524 for I/O (see FIG. 5A).

If, however, an object is moved from one location to another (for example, from one volume to another), the server system can create a new location ID for the object. In that case, the old location ID can become stale (e.g. invalid). The client may not be notified that the object has been moved or that the location ID is stale and may not receive the new location ID for the object, at least until the client subsequently attempts to access that data object (e.g., by providing an object handle with an invalid location ID). Alternatively, the client may be notified but may not be able or configured to accept or understand the notification.

The current mapping from global object ID to location ID is stored reliably in the OLS 516. If, during fast path I/O, the server system 202 discovers that the target data object no longer exists at the location pointed to by the provided location ID, this means that the object have been either deleted or moved. Therefore, at that point the server system 202 can invoke the OLS 516 to determine the new (valid) location ID for the target object. The server system 202 then uses the new location ID to read/write the target object. At the same time, the server system 202 invalidates the old location ID and returns a new object handle to the client that contains the unchanged and unique global object ID, as well as the new location ID. This process enables clients to transparently adapt to objects that move from one location to another (e.g. in response to a change in policy).

By using this technology, a client does not need to refresh the object handle when the location ID changes. In this case, the server system can map the unchanging global object id to location ID. This can be done efficiently by compactly storing the mapping from global object ID to location ID in, for example, cache memory of one or more network modules.

As noted above, the distributed object store can enable path-based access to data objects as well, and such path-based access is explained in further detail in the following sections.

Object Location

In a traditional storage system, a file is represented by a path e.g., "/u/foo/bar/file.doc". In other words, "u" is a directory under the root directory "/", "foo" is a directory under "u", and so on. Therefore, a file is uniquely identified by a single path. However, since file handles and directory handles are tied to a location in a traditional storage system, an entire path name is tied to a specific location (e.g., as indicated by an inode of the file), making it difficult to move files around without having to rename them.

An inode is a data structure, e.g., a 128-byte structure, which is used to store information, e.g., metadata, about a data container. Examples of data containers, as may be used herein, include files, directories, etc. The metadata contained in an inode may include data information, e.g., ownership of a file, access permission for the file, size of the file, file type, location of the file on disk, etc., as is described in more detail below. The file system uses a file handle, e.g., an identifier that includes an inode number, to retrieve an inode from a storage disk.

Figure 5D:
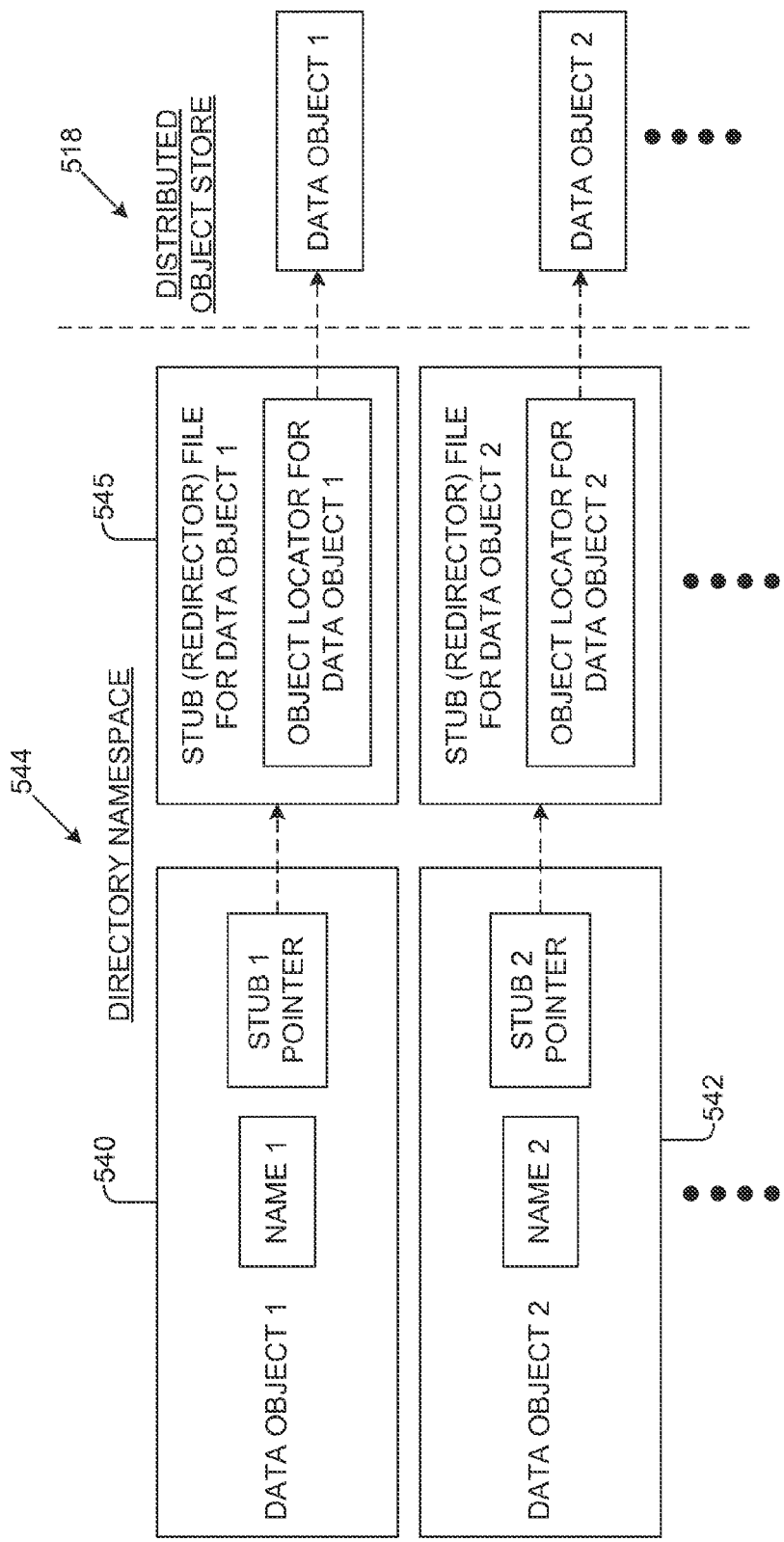
FIG. 5D is a block diagram illustrating a mechanism for a storage system to introduce a layer of separation between a directory entry of a data object and a physical location at a storage device where the data object is stored, in which the technology can be implemented in various embodiments.

FIG. 5D is a block diagram illustrating a mechanism for a storage system to introduce a layer of separation between a directory entry of a data object and a physical location at a storage device where the data object is stored, in which the technology can be implemented in various embodiments. The illustrated mechanism enables a server system to break the tight relationship between path names and location. As illustrated in FIG. 5D, path names of data objects in the server system can be stored in association with a namespace (e.g., a directory namespace 544). The directory namespace 544 can maintain a separate directory entry (e.g., 540, 542) for data object stored in the distributed object store 518. A directory entry, as indicated herein, refers to an entry that describes a name of any type of data object (e.g., directories, files, other such logical containers of data, etc.). The directory entry can include, for example, a path name (e.g., NAME 1 in FIG. 5D) of the data object and a pointer (e.g., STUB 1 POINTER in FIG. 5D) for mapping the directory entry to the data object.

In a traditional storage system, the pointer (e.g., an inode number) directly maps the path name to an inode associated with the data object. In contrast, in the illustrated embodiment, the pointer of data objects can point to a stub file or a "redirector file" (used interchangeably in this specification) associated with the data object. A redirector file, as indicated herein, refers to a file that maintains an object locator of the data object. The object locator of the data object can either be the multilevel object handle 534 or just the global object ID of the data object. In the illustrated embodiment, the redirector file (e.g., redirector file for data object 1) is also stored within the directory namespace 544. In addition to the object locator data, the redirector file may also contain other data, e.g., metadata about the location of the redirector file, etc.

As illustrated in FIG. 5D, for example, the pointer included in the directory entry 540 of data object 1 points to a redirector file 545 for data object 1 (instead of pointing to, for example, the inode of data object 1). The directory entry 540 does not necessarily include any inode references to data object 1. The redirector file for data object 1 includes an object locator (e.g., the object handle or the global object ID) of data object 1. As indicated above, either the object handle or the global object ID of a data object can be used for identifying the specific location (e.g., a physical address) of the data object within the distributed object store 518. Accordingly, the server system 202 can map the directory entry of the data object to the specific location of the data object within the distributed object store 518. By using this mapping in conjunction with the OLS 516 (e.g., by mapping the path name to the global object ID and then mapping the global object ID to the location ID), the server system 202 can mimic a traditional file system hierarchy, while providing the advantage of location independence of directory entries.

By having the directory entry pointer of a data object point to a redirector file (containing the object locator information) instead of pointing to an actual inode of the data object, the server system introduces a layer of indirection between (e.g., provides a logical separation of) directory entries and storage locations of the stored data object. This separation facilitates transparent migration (e.g., a data object can be moved without affecting its name), and moreover, it enables any particular data object to be represented using multiple path names, thereby facilitating navigation. In particular, this allows the implementation of a hierarchical protocol e.g., NFS on top of an object store, while at the same time allowing access via a flat object address space (wherein clients directly use the global object ID to access objects) and maintaining the ability to do transparent migration.

Figure 5E:
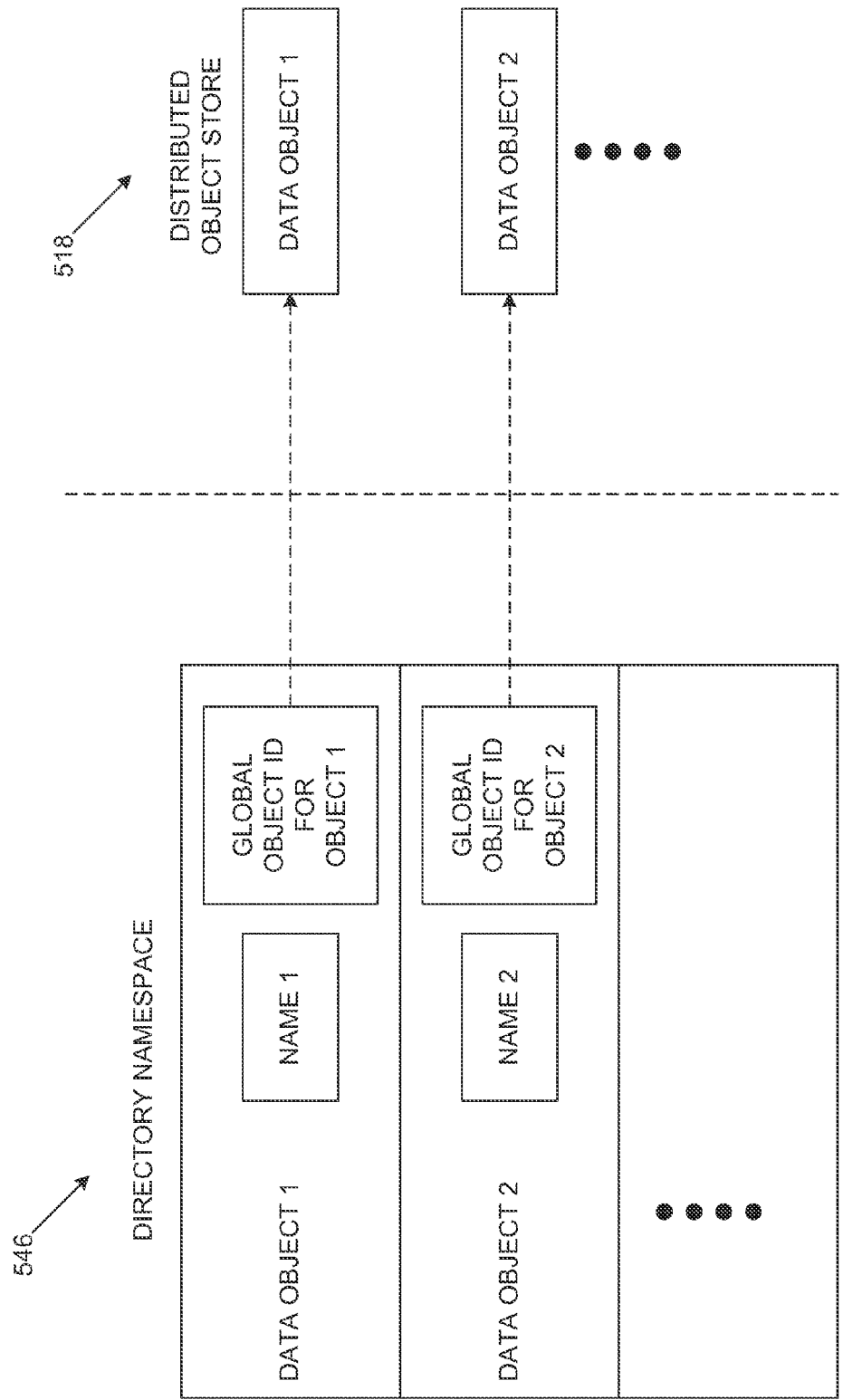
FIG. 5E is a block diagram illustrating a mechanism that allows a storage system to introduce a layer of separation between the directory entry of the data object and the physical location at a storage device of the data object by including a global object ID within the directory entry, in which the technology can be implemented in various embodiments.

In various embodiments, instead of using a redirector file for maintaining the object locator (e.g., the object handle or the global object ID) of a data object, the server system can store the global object ID of the data object directly within the directory entry of the data object. An example of such an embodiment is illustrated in FIG. 5E, which is a block diagram illustrating a mechanism that allows a storage system to introduce a layer of separation between the directory entry of the data object and the physical location at a storage device of the data object by including a global object ID within the directory entry, in which the technology can be implemented in various embodiments. In the illustrated embodiment, the directory entry for data object 1 includes a path name and the global object ID of data object 1. In a traditional server system, the directory entry would contain a path name and a reference to an inode (e.g., the inode number) of the data object. Instead of storing the inode reference, the server system stores the global object ID of data object 1 in conjunction with the path name within the directory entry of data object 1. As explained above, the server system can use the global object ID of data object 1 to identify the specific location of data object 1 within the distributed object store 518. In the illustrated embodiment, the directory entry includes an object locator (e.g., a global object ID) instead of directly pointing to the inode of the data object, and therefore still maintains a layer of indirection between the directory entry and the physical storage location of the data object. As indicated above, the global object ID can be permanently attached to the data object and can remain unchanged even if the data object is relocated within the distributed object store 518.

Expandable Storage Volume

Figure 6A:
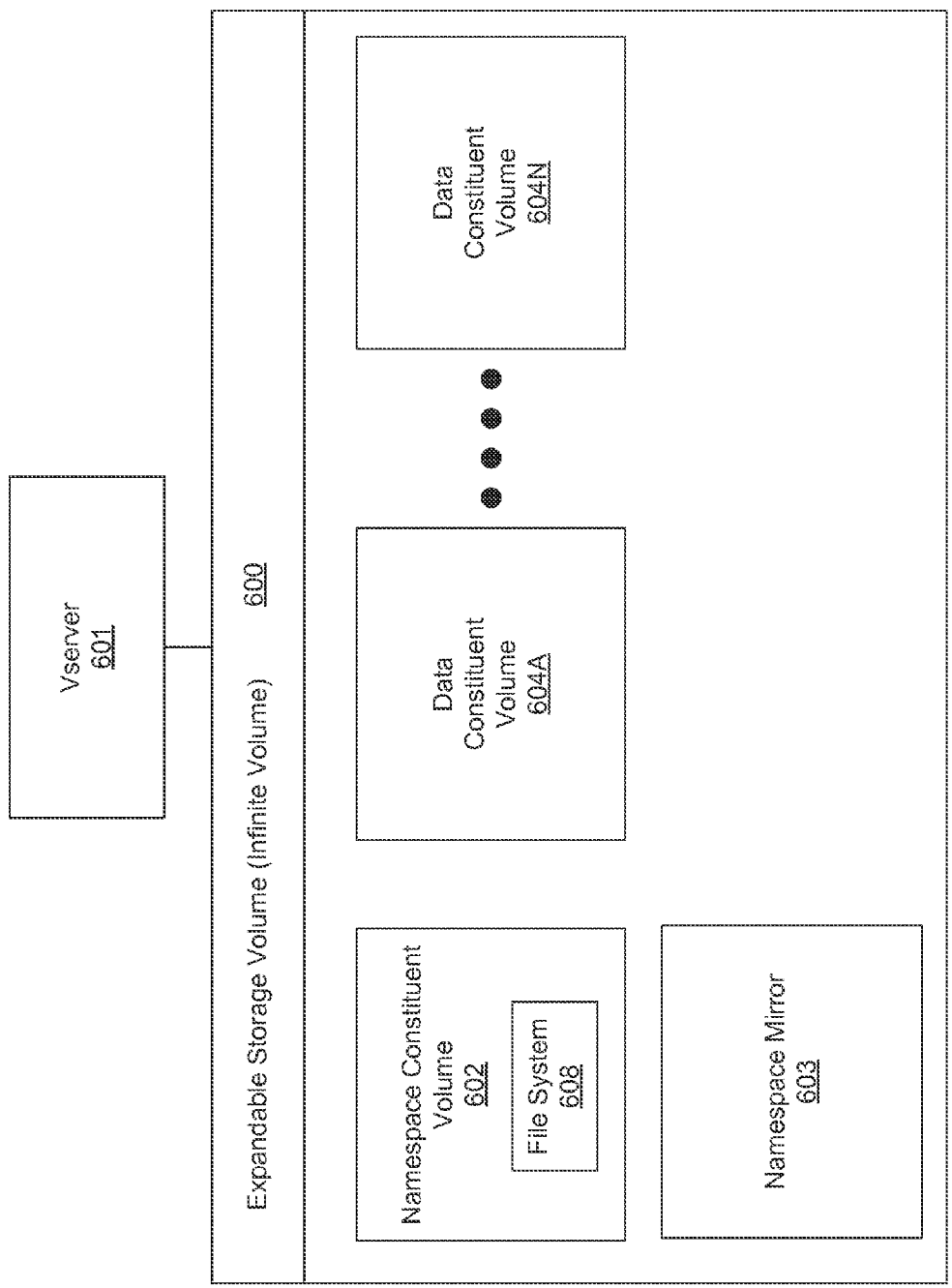
FIG. 6A is a block diagram illustrating an expandable storage volume that is replicated, in which the technology can be implemented in various embodiments.

FIG. 6A is a block diagram illustrating an expandable storage volume that is replicated, in which the technology can be implemented in various embodiments. The expandable storage volume 600 may be presented to a vserver 601 and used by clients for storing information within the content repository described above. Expandable storage volume 600 may include a namespace constituent volume 602 (similar to namespace 506 described above with respect to FIG. 5A-5D) and multiple data constituent volumes 604A-604N. Here, a data constituent volume may include data stored on one or more physical storage devices that are associated with the storage nodes of the expandable storage volume 600. The storage nodes are similar to single node object stores 520 described above with respect to FIG. 5A-5D. The namespace constituent volume 602 and data constituent volumes 604A-604N can be flexible volumes. A flexible volume is a volume which is flexibly associated with the underlying physical storage (e.g., aggregate).

The namespace constituent volume 602 can be used to store metadata of the data object, e.g. name, directory information, and data object attributes. The namespace constituent volume 602 can further maintain the file system 608 of the expandable storage volume 600 (e.g., the file system of the clustered storage system), where the file system 608 presents the information stored within the content repository of the expandable storage volume 600 to the clients. The namespace constituent volume 602 can be stored in a dedicated namespace node (not illustrated), or share a storage node with some of the data constituent volumes 604A-604N. Also, the data storage node may have its own local file system and may be used to store the clients' data. The expandable storage volume 600 further includes a namespace mirror as a backup of the namespace constituent volume 602. FIG. 6C provides additional details on the local file system maintained by the data storage node and its function within the expandable storage volume 600. The expandable storage volume 600 further includes a storage operating system 606 to logically organize the data objects (e.g. files) within the expandable storage volume 600.

Figure 6B:
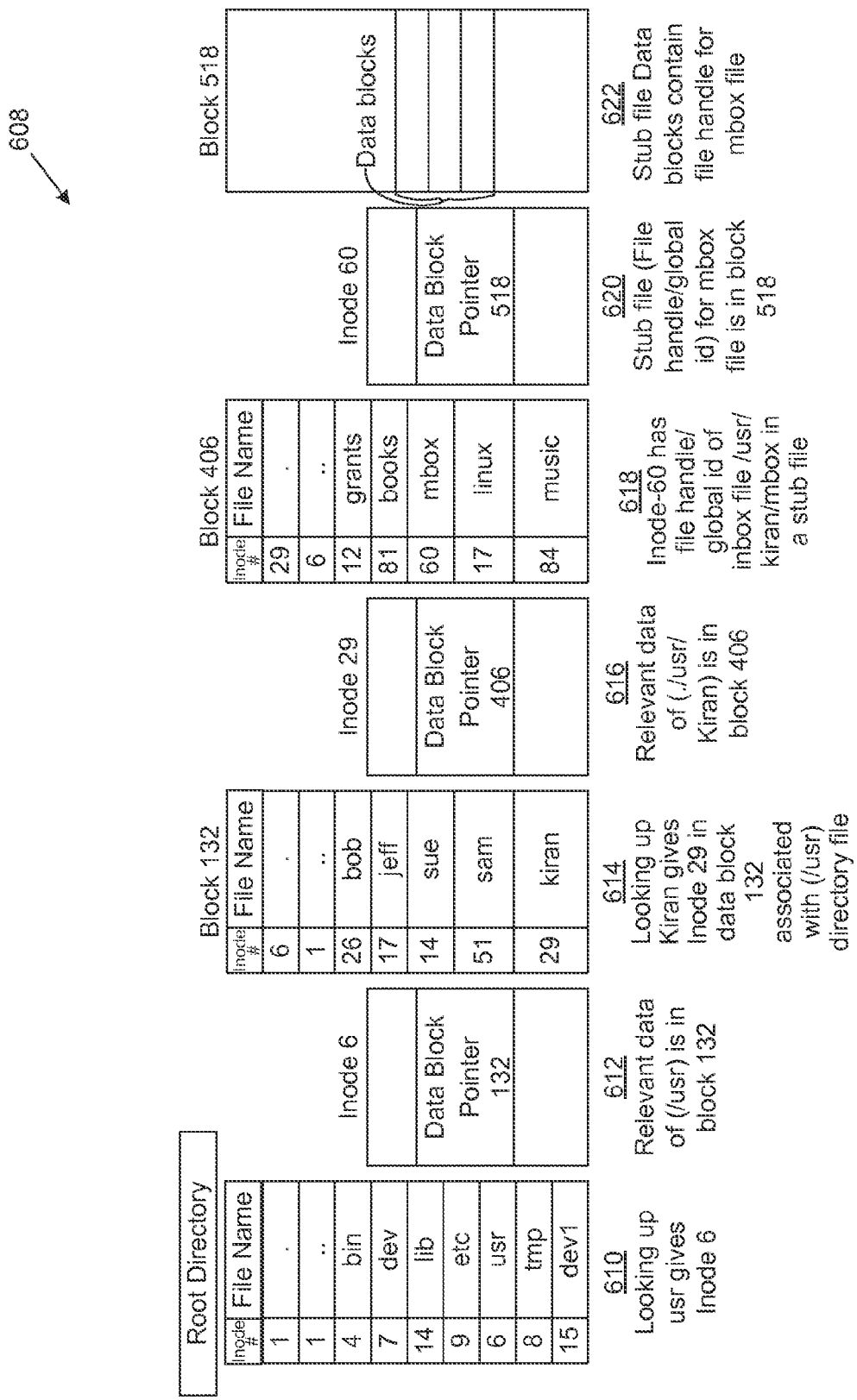
FIG. 6B is a table diagram illustrating an example of utilizing the namespace storage node's file system to access file with pathname "./usr/kiran/mbox," in various embodiments.
Figure 6C:
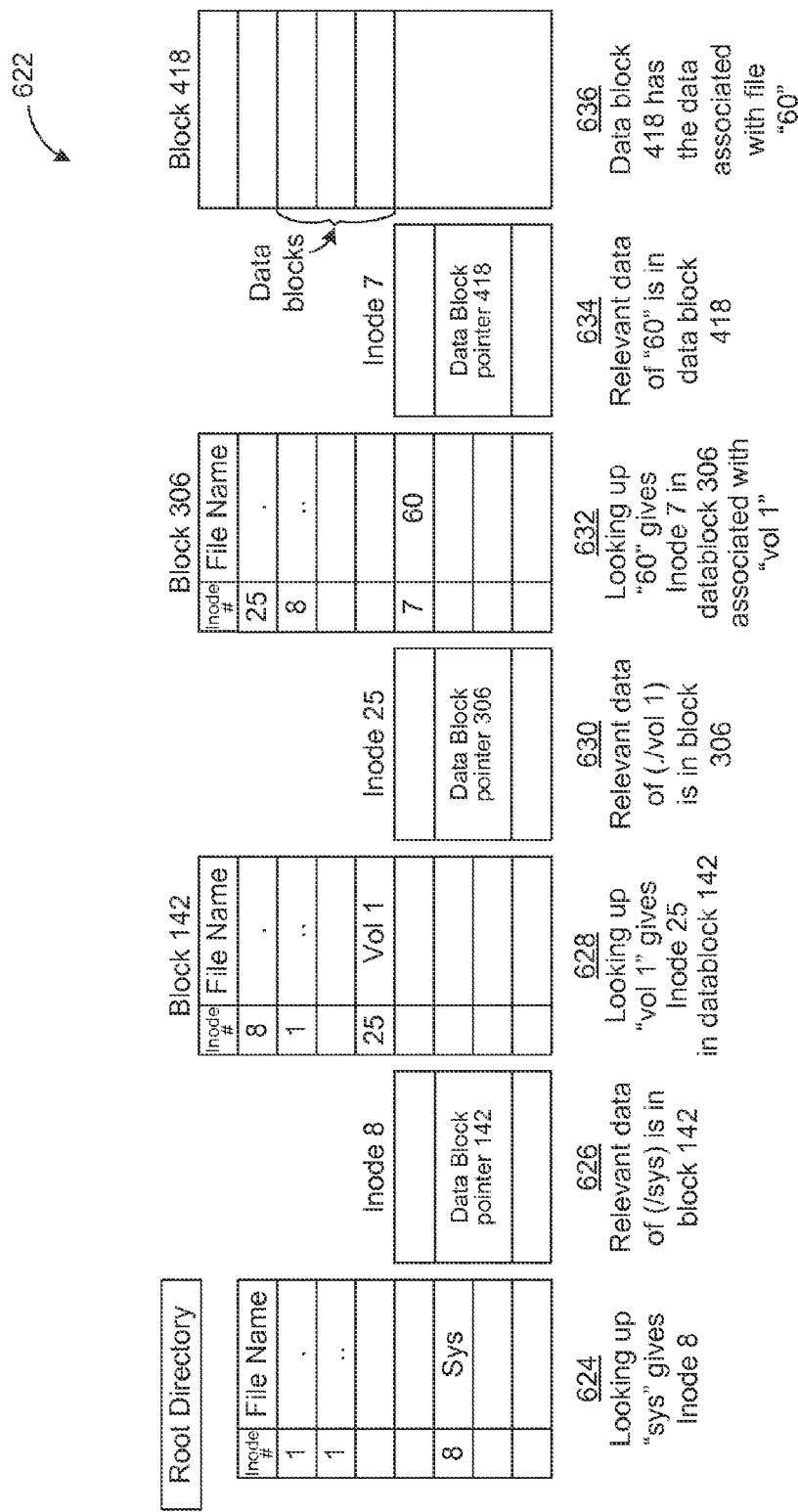
FIG. 6C is a table diagram illustrating an example of utilizing data storage node file system to access data associated with file "inbox" in path "./sys/vol1/60," in various embodiments.

FIG. 6B is a table diagram illustrating an example of utilizing the namespace storage node's file system to access file with pathname "./usr/kiran/mbox," in various embodiments. FIG. 6B illustrates a file system 608 and its associated inode data, maintained by a storage operating system of the expandable storage volume 600. In FIG. 6B, the file system 608 is used by the storage operating system 606 to logically organize and present a file "mbox" to the clients (e.g. 204A-204M in FIG. 2), where the data associated with the file "mbox" is stored within the content repository of the expandable storage volume 600 under path name "./usr/kiran/mbox". As discussed above with reference to FIG. 5D, in a file system of a conventional storage system, a pointer (e.g., an inode number) directly maps the path name to an inode associated with the data object. However, in expandable storage volume 600, the file system, maintained by the namespace constituent volume 602, maps the path name to a stub file. The stub file, as indicated herein, refers to the file that maintains an object locator of the data object. The object locator of the data object can be a multilevel object handle 534 returned by one of the data storage nodes after storing the data object within itself.

Figure 6D:
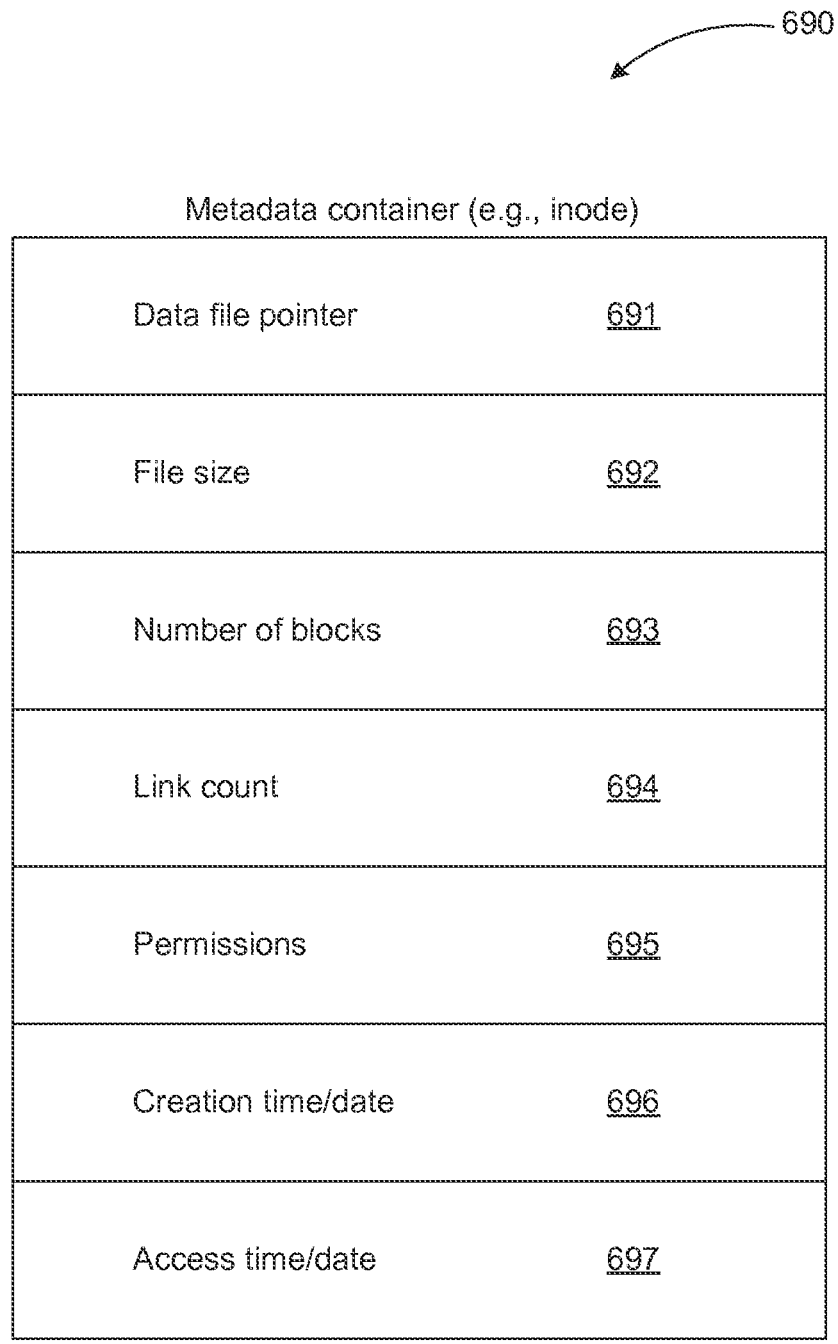
FIG. 6D is a block diagram illustrating a metadata container (e.g., inode), in which the technology can be implemented in various embodiments.

As illustrated in FIG. 6B, the file "mbox" is created and stored by the storage operating system 606 under the pathname "./usr/kiran/mbox", provided by one of the clients, in expandable storage volume 600. The storage operating system 606 creates in the file system 608 the various directories and sub directories in the pathname, e.g., directory "usr" and sub directory "kiran" under directory "usr", if the directories/sub directories are not present in the file system 602, and associates an inode file with one of the directories. The "inode" file is illustrated in FIG. 6D. FIG. 6D is a block diagram illustrating a metadata container (e.g., inode), in which the technology can be implemented in various embodiments. The inode file contains the metadata associated with the directories/sub directories. One of the purposes of the inode 690 is to store metadata about a particular directory, e.g., a pointer 691 to the data blocks associated with the directory, the size 692 (e.g., in kilobytes) of the directory, the number of data blocks 693, the link count 694 (number of references to that directory), permissions 695 that are associated with the directory, creation time/date 696 of the directory, and access time/date 697 to the directory.

Further as illustrated in FIG. 6B, a root directory 610 of the file system 608 maintains a mapping between the files/directories under the root "." of the file system 608 and their corresponding inode files. Additionally, in the file system 608, the inode file container number "6" 612 is associated with directory "usr" and inode file container number "29" 616 is associated with directory "kiran". The inode files container number "6" 612 and container number "29" 616 include pointers to data blocks associated with the directories "usr" and "kiran" respectively. The data blocks associated with directories, e.g., "usr" and "kiran", contain a lookup table, mapping filenames to the inode numbers of the various files/directories under the directories. As illustrated n FIG. 6B, the lookup table 614 in data block "132" is associated with directory "usr" and the lookup table 618 in data block "406" is associated with directory "kiran". In addition, the file "mbox" is created and stored under sub directory "kiran" in the pathname "./usr/kiran/mbox". The inode file container number "60" 620 is created and associated with the regular file "mbox" (as opposed to directory type files e.g., "usr" and "kiran"), where the inode file container number "60" 620 stores all the meta data associated with the file "mbox" including the data blocks associated with the file "mbox". The inode files container number "60" 620 includes pointers to data blocks associated with the file "mbox".

As discussed above, unlike a conventional file system in which data blocks associated with regular files contain the data associated with the regular files, in the expandable storage volume 600 file system 602, the data blocks associated with regular files contain an object locator of the data associated with the regular files. Here, the data blocks 622 stored in block "518", associated with the "mbox" regular file, contain a multilevel object handle 534 returned by one of the data storage nodes after storing the data associated with the "mbox" file within itself. Therefore, any modification to the data associated with the "mbox" file, e.g., addition or deletion of content from the data, may be carried out in the data storage node, where the "mbox" file's data is stored in, without any modification to the file system 602 or the associated inode files stored in the namespace constituent volume 602.

For example, when a client sends a request to modify the content of file "mbox" under pathname "./usr/kiran/mbox", in various embodiments, the storage operating system 606 can utilize the directory namespace 544 to lookup the stub file pointer (e.g., inode container number of stub file) to access and retrieve the multilevel object handle 534 that is returned by the data storage node 208A after storing the data associated with the "mbox" file within its storage node 208A. In various embodiments, to perform the content modification requested by the client, the storage operating system 606 sends the client's content modification request along with the retrieved multilevel object handle 534 to the data storage node 208A to carry out the request.

In various embodiments, when a client sends a request to modify the content of file "mbox" under pathname "./usr/kiran/mbox", the storage operating system 606 first retrieves the root directory lookup table 610 of the file system 608 and identifies the inode container number of the directory "usr" as inode container number "6" 612. The file system next retrieves the inode container number "6" 612 and identifies the pointer "132" to the data block storing the data associated with directory "usr". In this case, given that "usr" is a directory, the data block associated with pointer "132" contains a lookup table mapping filenames to the inode numbers of the various files/directories under the directory "usr". The storage operating system 606 next searches for the inode container number of the sub-directory "kiran" (based on client provided pathname "./usr/kiran/mbox") in the lookup table 614 associated with data block of the directory "usr" and identifies the inode container number of the subdirectory "kiran" as inode container number "29" 616. The storage operating system 606 retrieves the inode container number "29" 616 and identifies the pointer "406" to the data block storing the data associated with subdirectory "kiran". In this case, given that "kiran" is a directory, the data block associated with pointer "406" contains a lookup table mapping filenames to the inode numbers of the various files/directories under the directory "kiran".

The storage operating system 606 next searches for the inode container number of the regular file "mbox" (based on client provided pathname "./usr/kiran/mbox") in the lookup table 618 associated with data block of the directory "kiran" and identifies the inode container number of the file "mbox" as inode container number "60" 620. The storage operating system 606 retrieves the inode container number "60" 620 and identifies the pointer "518" to the data block storing the data associated with regular file "mbox". In this case, given that "mbox" is a regular file, the data block associated with pointer "518" contains a multilevel object handle 534, returned by the data storage node 208A, to the data associated with the "mbox" file that is stored within the node 208A.

In various embodiments, to perform the content modification requested by the client, the storage operating system 606 retrieves the multilevel object handle 534 and sends the client's content modification request along with the retrieved multilevel object handle 534 to the data storage node 208A to carry out the request. Therefore, any modification to the data associated with the "mbox" file, e.g., adding or deleting content from the data, will be carried out in the data storage node 208A-208N, where the "mbox" file's data is stored in, without any modification to the file system 608 or the associated inode files stored in the namespace constituent volume 602. On the other hand, when a file/directory is deleted or created in the file system 608, inode files associated with the file/directory are accordingly deleted or created in the file system 608.

While FIG. 6B and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 6C is a table diagram illustrating an example of utilizing data storage node file system to access data associated with file "inbox" in path "./sys/vol1/60," in various embodiments. As illustrated in FIG. 6C, file system 622 and its associated inode data are maintained by the storage operating system 606 of the expandable storage volume 600. In FIG. 6C, the file system 622 is used by the storage operating system 606 to logically organize and store the data associated with the file "mbox". As discussed earlier with reference to FIG. 6A, the data storage node may have its own storage operating system, file system and may be used to store the client's data (e.g., "mbox" file's data). Here, when the client wants to store the file "mbox" in the clustered storage server, a request is sent from the namespace constituent volume 602 to one of the data storage nodes (e.g., data storage nodes 208A in FIG. 2) to create a file and store the data of the "mbox" file within the newly created file. Further, the request from the namespace constituent volume 602 provides a file name for the newly created file in the data storage nodes.

In various embodiments, the file name for the newly created file can be the inode container number of the "mbox" file in the namespace constituent volume 602 (e.g., inode container number "60"). The storage operating system 606 creates a new file "60" in its file system 622 under pathname "./sys/vol1/" (where, in one instance, the pathname is determined by the storage operating system 606 internally), creates and associates a new inode file container number "7" 634 with the new file "60", and returns a file handle 534 to the namespace constituent volume 602. The file handle 534 includes a location ID 536 that incorporates the pathname "./sys/vol1/60" and the number of the data storage node 208A.

The next time the client attempts to modify the file "mbox" in the clustered storage server 202, the storage operating system 606 retrieves the file handle 534 stored in the stub file associated with the "mbox" file and sends a request to the data storage node along with the retrieved file handle 534 and the modified data from the client. In the data storage node 208A, the storage operating system 606 retrieves the location ID from the file handle 534, where the location ID includes the pathname "./sys/vol1/60" of the file to be modified. The storage operating system 606 accesses a root directory lookup table 624 of the file system 622 and identifies the inode container number of the directory "sys" as inode container number "8" 626.

The storage operating system 606 next retrieves the inode container number "8" 626 from the file system 622 and identifies the pointer "142" to the data block storing the data associated with directory "sys". In this case, given that "sys" is a directory, the data block associated with pointer "142" contains a lookup table mapping filenames to the inode numbers of the various files/directories under the directory "sys". The storage operating system 606 next searches the file system 622 for the inode container number of the sub-directory "vol1" (based on received pathname "./sys/vol1/60") in the lookup table 626 associated with data block of the directory "sys" and identifies the inode container number of the subdirectory "vol1" as inode container number "25" 628. The storage operating system 606 retrieves the inode container number "25" 628 and identifies the pointer "306" to the data block storing the data associated with subdirectory "vol1". In this case, given that "vol1" is a directory, the data block associated with pointer "306" contains a lookup table mapping filenames to the inode numbers of the various files/directories under the directory "vol1".

The storage operating system 606 next searches for the inode container number of the regular file "60" (based on client provided pathname "./sys/vol1/60") in the lookup table 628 associated with data block of the directory "vol1" and identifies the inode container number of the file "60" as inode container number "7" 630. The storage operating system 606 retrieves the inode container number "7" 630 and identifies the pointer "418" to the data block storing the data associated with regular file "60". In this case, given that "60" is a regular file, the data block 634 associated with pointer "418" contains the data associated with the file "60". The file system 622 retrieves the content stored in the data block 634 and modifies the content in the data block as per the client's request. In the event additional data blocks are needed to store additional data from the client, the file system allocates new blocks to store the additional data and stores the pointers to the new blocks in the inode container number "7" 630.

Similarly, in the event some of the data blocks assigned to the file "60" are freed after some of the previously stored data are deleted by the client, the file system removes the references to the pointers to the freed blocks from the inode container number "7" 630. Once the data access request is completed, the data storage node informs the namespace constituent volume 602 of the completion status, which can in turn inform the client of the completion of data access request. Thus, the file system 602 and its associated inode files of the namespace constituent volume 602 remain unchanged from a modification of an existing file while the modification is reflected in the file system 622 and its associated inode files of the data storage node 622.

The namespace constituent volume 602 stores the inode files of the data objects in the expandable storage volume 600. The metadata of the inode files are collected into this single namespace constituent volume 602. To save the expandable storage volume 600 from a single point of failure of the namespace constituent volume 602, the namespace mirror 603 synchronizes with the namespace constituent volume 602 and serves as a backup for the inodes files in the namespace constituent volume 602. When the namespace constituent volume 602 is not available for maintaining and providing the metadata, the namespace mirror 603 replaces the role of the unavailable namespace constituent volume 602. As a result, the expandable storage volume 600 can continue servicing data requests by accessing data objects metadata (e.g. the inode files) in the namespace mirror 603. Similar to the namespace constituent volume 602, the namespace mirror 603 can be implemented as a flexible volume.

Based on a predetermined schedule, the namespace mirror 603 automatically backs up the metadata of the inode files with the namespace constituent volume 602. For instance, the schedule can be predetermined to back up the metadata every 5 minutes. The interval between backups can be further reduced so that the namespace mirror 603 backs up the metadata of the namespace constituent volume 602 almost in real time. In various embodiments, a user of the system can adjust the schedule. As an example, a user can adjust the time interval of the schedule of backing up. Based on the workload of the system and the frequency of the read and write operations on the namespace constituent volume 602, the user can adjust the time interval that is suitable for the current situation. A user can also adjust schedule so that the namespace mirror 603 maintains and backs up a portion of the namespace constituent volume 602. As an example, a user can set up the schedule so that the portion of the namespace constituent volume that corresponds to the current active file system is backed up and maintained by the namespace mirror 603.

The storage system can perform various volume operations on the expandable storage volume 600. As an example, a volume online operation brings the expandable storage volume 600 online so that a client device can access the data stored in the expandable storage volume 600. The volume online operation also activates the backup operations of the namespace mirror 603. Once the expandable storage volume 600 is online, the clients write new data to the expandable storage volume 600 and the namespace constituent volume 602 updates its metadata (e.g. inode files) to reflect the changes on the data objects in the expandable storage volume 600. The namespace mirror 603 can back up the metadata in the namespace constituent volume 602, according to the predetermined schedule.

The storage system can also perform a volume offline operation to take the expandable storage volume 600 offline so that clients cannot access the data stored in the expandable storage volume 600. Upon receiving the instruction for a volume offline operation, the expandable storage volume 600 stops the backup operation of the namespace mirror 603.

The storage system can further perform a volume delete operation to delete the expandable storage volume 600. The storage system deletes the namespace constituent volume 602, the namespace 603, and the data constituent volumes 604A-604N in response to the volume delete operation.

The operations of the namespace mirror 603 can be transparent to clients. A client can access an expandable storage volume 600 in a manner similar to conventional storage volumes. The client does not need to be aware of the existence of the namespace mirror 603.

The storage system can also perform a volume snapshot operation to generate a snapshot of the expandable storage volume 600. During the volume snapshot operation, the storage system can generate snapshots for the namespace constituent volume 602 and the data constituent volumes 604A-604N. However, the volume snapshot operation may exclude the generation of a snapshot for the namespace mirror 603. The namespace mirror 603 can back up the metadata in the namespace constituent volume 602 at a frequency specified by the predetermined schedule. There can be a discrepancy between the content of the namespace mirror 603 and the namespace constituent volume 602. At any point in time, the content of the namespace mirror 603 can reflect a previous status of the namespace constituent volume 602 when the backup operation was performed. The namespace mirror 603 may not be included for the volume snapshot operation.

The storage system can further perform a volume snapshot restoration operation to restore the expandable storage volume 600 to one of its snapshots. During the volume snapshot operation, the storage system can restore the namespace constituent volume 602 and the data constituent volumes 604A-604N using their corresponding snapshots. In some embodiments, the storage system may not restore the namespace mirror 603 since the snapshot of the expandable storage volume 600 does not include a snapshot of the namespace mirror 603. Instead, the storage system resynchronizes the namespace mirror constituent 603 to the newly restored namespace constituent volume 602.

Figure 7A:
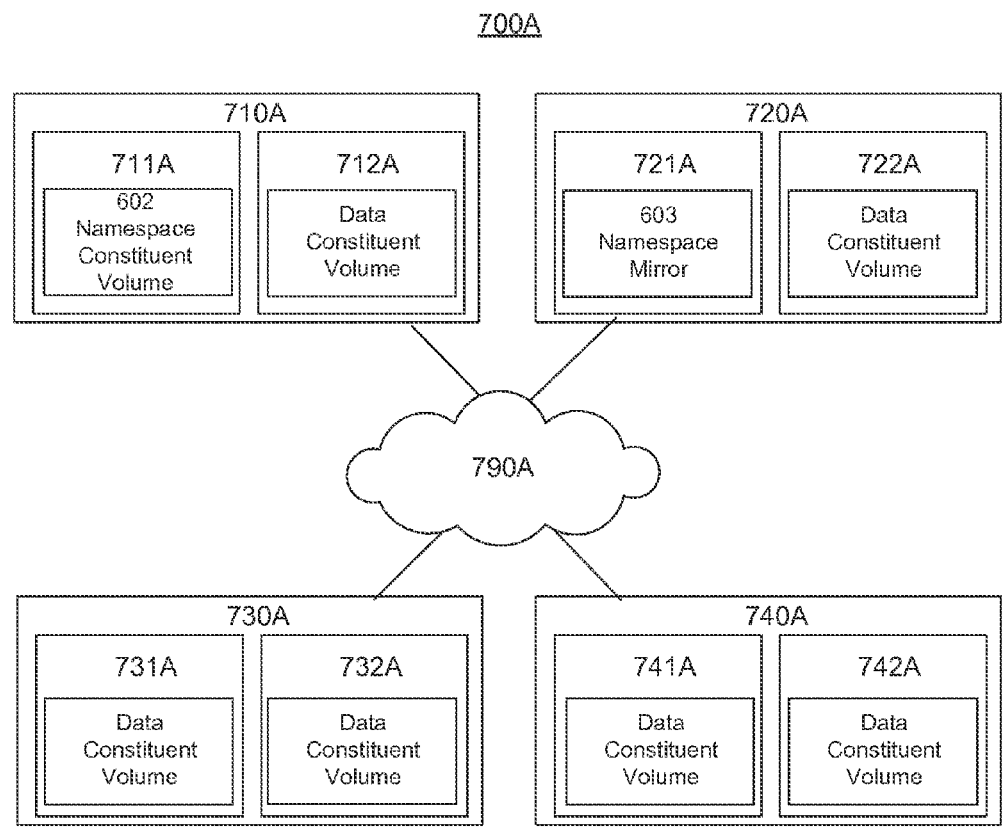
FIG. 7A is a block diagram illustrating an example of a storage system including multiple high-availability pairs for maintaining an expandable storage volume, in various embodiments.

The location of the namespace mirror 603 can be chosen to minimize the chance that the namespace mirror 603 and the namespace constituent volume 602 are both damaged. As an example, the namespace mirror 603 and the namespace constituent volume 602 can be stored in two separate high-availability pairs. FIG. 7A is a block diagram illustrating an example of storage system 700 including multiple high-availability pairs for maintaining an expandable storage volume, in various embodiments. A high-availability ("HA") pair is a pair of nodes that provide failover recovery for the data stored in the HA pair. The nodes within the HA pair are interconnected with special hardware so that the nodes can take over the data service of each other's storage. An HA cluster can detect hardware or software faults in one of its nodes and immediately cause another node to take over the service from the at-fault node without requiring administrative intervention. This is a process known as failover.

As illustrated in FIG. 7A, the storage system 700A can include multiple HA pairs 710A, 720A, 730A and 740A. An HA pair of the HA pairs 710A, 720A, 730A and 740A can include two nodes. For instance, HA pair 710A includes nodes 711A and 712A. In various embodiments, the storage system can include an HA cluster that includes more than two nodes within the HA cluster. The expandable storage volume 600 is implemented on the multiple HA pairs 710A, 720A, 730A and 740A. The HA pairs 710A, 720A, 730A and 740A can be interconnected via a network 790A, which can be a packet-switched network, for example, a local area network (LAN), wide area network (WAN) or any other type of network.

In various embodiments, the namespace mirror 603 locates in an aggregate having a maximum available space in a high-availability pair that does not contain the namespace constituent volume 602. As illustrated in FIG. 7A, the namespace constituent volume 602 locates in the node 711A of the HA pair 710A. The namespace mirror 603 chooses to locate in the node 721A of the HA pair 720A. Nodes (e.g. Filers) in a HA pair can be implemented on the same server shelf. By locating the namespace mirror 603 on another HA pair, the expandable storage volume 600 minimizes the chance that both the namespace mirror 603 and the namespace constituent volume 602 are lost due to a single failure of a server shelf (e.g. power outage of the server shelf).

Figure 7B:
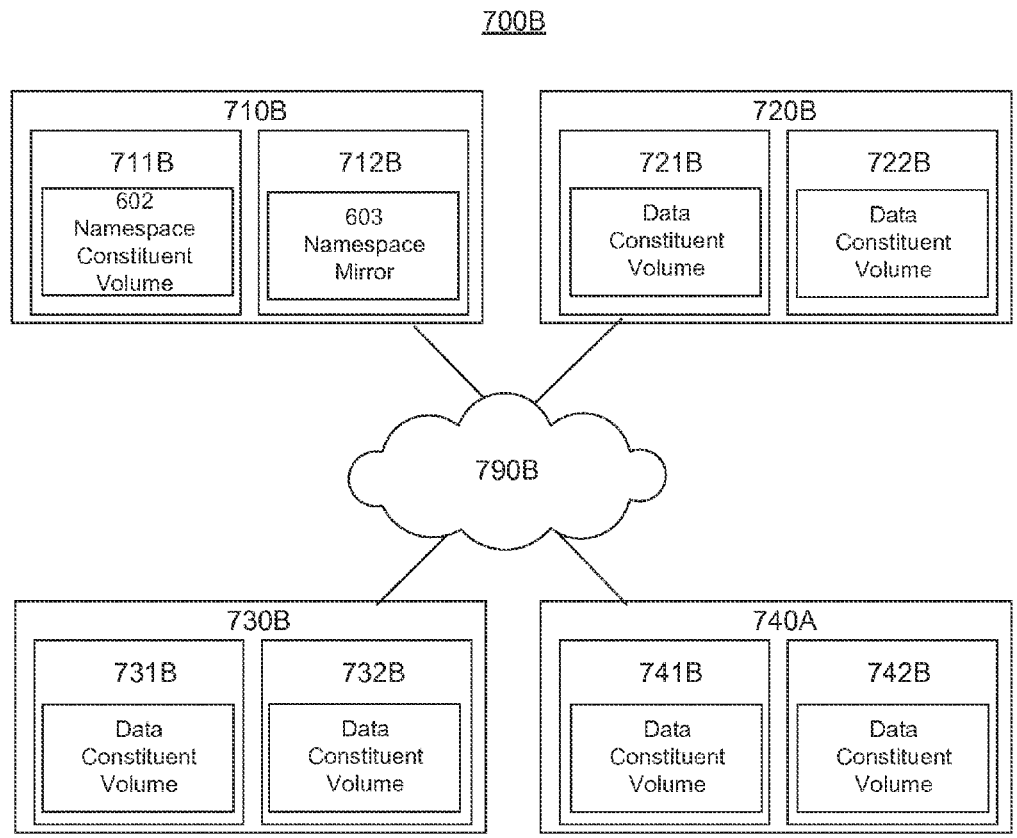
FIG. 7B is a block diagram illustrating an example of a storage system including multiple high-availability pairs for maintaining an expandable storage volume, in various embodiments.

FIG. 7B is a block diagram illustrating another example of a storage system 700B including multiple high-availability pairs for maintaining an expandable storage volume, in various embodiments. Similar to storage system 700A, storage system 700B can include HA pairs 710B, 720B, 730B and 740B that are interconnected via a network 790B If there is no aggregate having sufficient space for the namespace mirror 603 in high-availability pairs other than the HA pair that contains the namespace constituent volume 602, the namespace mirror 603 can locate in an aggregate having the maximum available space in the HA pair that contains the namespace constituent volume 602, among the aggregates in that HA pair other than the aggregates occupied by the namespace constituent volume 602. As illustrated in FIG. 7B, the HA pairs 720B, 730B and 740B do not have any aggregate left with enough space for accommodating the namespace mirror 603. Therefore, the namespace mirror 603 chooses to locate in an aggregate within the node 712B. The namespace mirror 603 and the namespace constituent volume 602 can occupy separate nodes (712B and 711B respectively, and therefore separate aggregates) within the same HA pair 710B.

Figure 8:
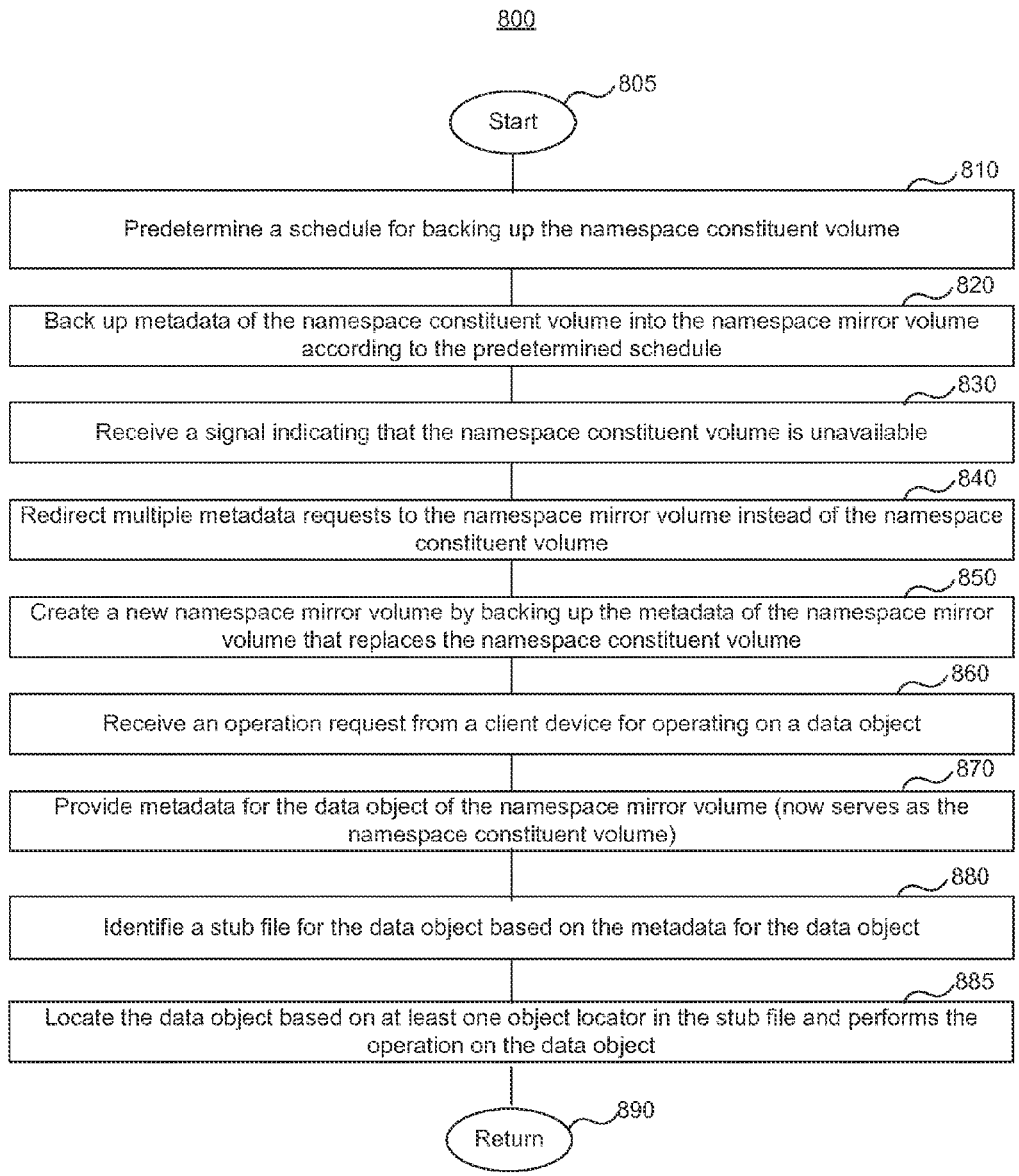
FIG. 8 is a flow diagram illustrating a process for backing up metadata for data objects in an expandable storage volume, in various embodiments.

FIG. 8 is a flow diagram illustrating a process 800 for backing up metadata for data objects in an expandable storage volume, in various embodiments. The expandable storage volume includes a namespace constituent volume, a namespace mirror volume, and multiple data constituent volumes. A storage system maintains the expandable storage volume. The data constituent volumes can be flexible volumes. The process 800 starts at 805. At step 810 of the process 800, the storage system ("system") predetermines a schedule for backing up the namespace constituent volume.

At step 820, the system backs up metadata of the namespace constituent volume into the namespace mirror volume according to the predetermined schedule. The namespace constituent volume can store metadata for data objects stored in the data constituent volumes. The metadata can be organized as inode files stored in the namespace constituent volume. The inode files can include metadata for one data object of the data objects. As an example, the metadata can include pointers to stub files, and the stub files can maintain object locators for the content of the data object.

At step 830, the system receives a signal indicating that the namespace constituent volume is unavailable. In response to the signal, at step 840, the system redirects multiple metadata requests to the namespace mirror volume instead of the namespace constituent volume. As a result, the namespace mirror volume becomes the new namespace constituent volume. At step 850, the system further creates a new namespace mirror volume by backing up the metadata of the namespace mirror volume which replaces the namespace constituent volume.

At step 860, the system receives an operation request from a client device for operating on a data object. At step 870, in response to the request, the system provides metadata for the data object of the namespace mirror volume (which now serves as the namespace constituent volume). At step 880, the system identifies a stub file for the data object based on the metadata for the data object. At step 885, the system locates the data object based on at least one object locator in the stub file and performs the operation (e.g. read or write) on the data object. At step 890, the process 800 returns to a process that calls the process 800.

In various embodiments, the system can receive an operation to set the expandable storage volume offline, or other volume operation including setting volume online. In response to the volume offline operation, the system can stop backing up the metadata of the namespace constituent volume to the namespace mirror volume. The volume operation can happen in various stages of the process 800. For instance, the volume operation and the stop of backing up namespace constituent volume can happen before or after the original namespace mirror volume becoming unavailable (e.g. step 820).

Those skilled in the art will appreciate that the logic illustrated in FIG. 8 and described above, and in each of the flow diagrams discussed below, may be altered in a variety of ways. For example, the order of the logic may be rearranged, substeps may be performed in parallel, illustrated logic may be omitted, other logic may be included, etc.

Figure 9:
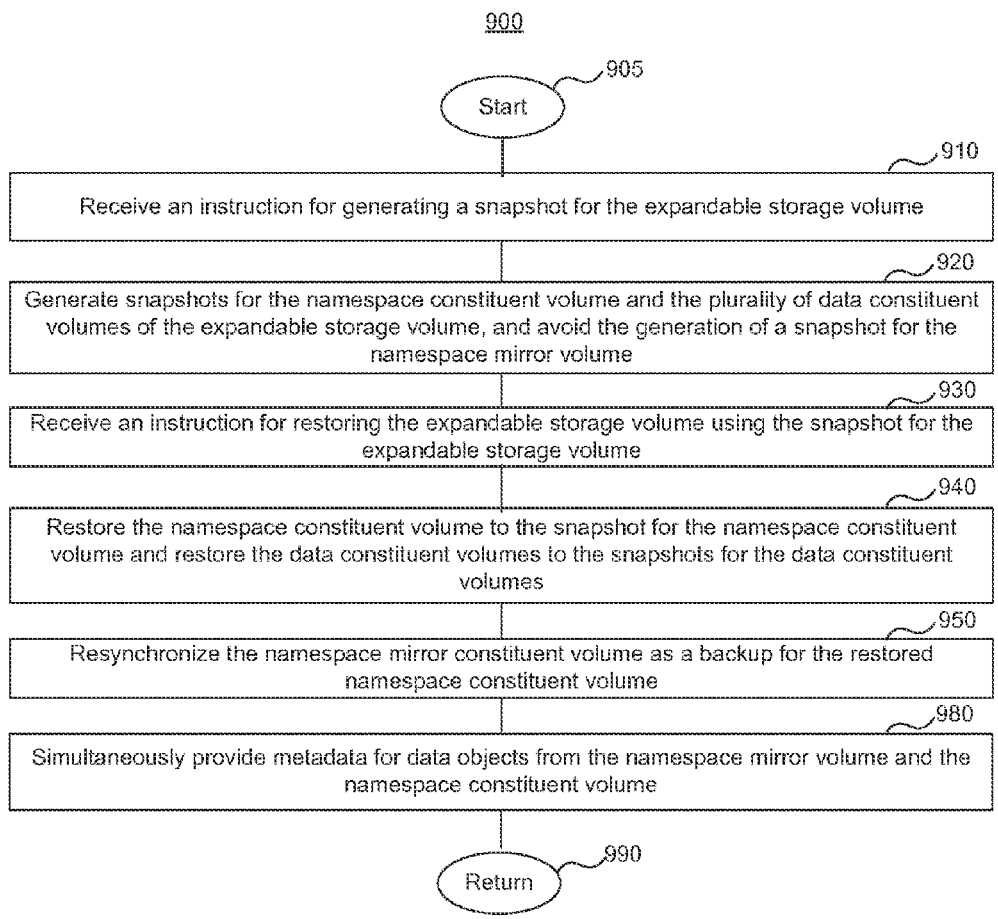
FIG. 9 is a flow diagram illustrating a process for generating and restoring snapshots for the expandable storage volume, in various embodiments.

FIG. 9 is a flow diagram illustrating a process 900 for generating and restoring snapshots for the expandable storage volume, in various embodiments. The process 900 starts at 905. At step 910, the storage system receives an instruction for generating a snapshot for the expandable storage volume. At step 920, in response to the instruction, the system generates snapshots for the namespace constituent volume and the data constituent volumes of the expandable storage volume, and avoids the generation of a snapshot for the namespace mirror volume.

At step 930, the system receives an instruction for restoring the expandable storage volume using the snapshot for the expandable storage volume. At step 940, in response to the instruction, the system restores the namespace constituent volume to the snapshot for the namespace constituent volume and restores the data constituent volumes to the snapshots for the data constituent volumes.

At step 950, the system resynchronizes the namespace mirror constituent volume as a backup for the restored namespace constituent volume.

In various embodiments, the system can utilize a "write through" process. The system receives a write operation to the namespace constituent volume. The system applies the write operation to the namespace constituent volume and the namespace mirror volume. Then the system replies to the write operation using a signal indicating that the write operation is successful. As an alternative to the "write through" process, in various embodiments, the system can directly apply the write operation to the namespace constituent volume and back up metadata of the namespace constituent volume into the namespace mirror volume according to a predetermined schedule.

Optionally at step 980, the system can simultaneously provide metadata for data objects from the namespace mirror volume and the namespace constituent volume in response to operation requests for the data objects, in order to improve the work load balancing between the namespace mirror volume and the namespace constituent volume. At step 990, the process 900 returns to a process that calls the process 900.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

What is claimed is:

1. A method comprising:
backing up metadata of a namespace constituent volume into a first namespace mirror volume, wherein the namespace constituent volume stores the metadata for data objects stored in data constituent volumes that are separate from the namespace constituent volume, wherein the first namespace mirror volume is separate from the namespace constituent volume and separate from the data constituent volumes;
determining to provide metadata indicated in a first metadata request from the namespace constituent volume for a first data object of the data objects based, at least in part, on a comparison of a frequency of access operations on the namespace constituent volume with a frequency of access operations on the first namespace mirror volume;
based on an indication that the namespace constituent volume is unavailable, redirecting the first metadata requests to the first namespace mirror volume instead of the namespace constituent volume; and
providing metadata for the first data object from the first namespace mirror volume.

2. The method of claim 1, wherein backing up the metadata of the namespace constituent volume into the first namespace mirror volume comprises:
copying a redirector object for a second data object of the data objects from the namespace constituent volume to the first namespace mirror volume, wherein the redirector object includes an object locator indicating a location of the second data object within a data constituent volume of the data constituent volumes.

3. The method of claim 1, wherein backing up the metadata of the namespace constituent volume into the first namespace mirror volume comprises:

backing up the metadata of the namespace constituent volume into the first namespace mirror volume according to a predetermined schedule.

4. The method of claim 1, wherein an expandable storage volume comprises the namespace constituent volume, the first namespace mirror volume, and the data constituent volumes.

5. The method of claim 1, wherein the metadata are organized as inode files stored in the namespace constituent volume, wherein each of the inode files includes metadata for a data object of the data objects.

6. The method of claim 1, wherein the first namespace mirror volume is located in a high-availability pair separate from another high-availability pair that contains the namespace constituent volume.

7. The method of claim 4, further comprising:
based on an operation to set the expandable storage volume offline, stopping the backing up the metadata of the namespace constituent volume to the first namespace mirror volume.

8. The method of claim 1, further comprising:
identifying a stub file for the first data object based, at least in part, on the metadata for the first data object; and
locating the first data object based, at least in part, on an object locator stored in the stub file.

9. The method of claim 1, further comprising:
adjusting a backup schedule based, at least in part, on a workload of the namespace constituent volume, wherein the metadata of the namespace constituent volume is backed up into the first namespace mirror volume according to the backup schedule.

10. The method of claim 1, wherein backing up the metadata of the namespace constituent volume into the first namespace mirror volume comprises:
backing up a portion of metadata of the namespace constituent volume into the first namespace mirror volume, wherein the portion of the metadata corresponds to an active file system including multiple data constituent volumes.

11. The method of claim 1, wherein backing up the metadata of the namespace constituent volume into the first namespace mirror volume comprises, based on receipt of a request to write first metadata to the namespace constituent volume, writing the first metadata to the namespace constituent volume and the first namespace mirror volume.

12. The method of claim 1, further comprising:
monitoring available storage space for a first aggregate, wherein the namespace constituent volume and the first namespace mirror volume are located on the first aggregate; and
based on determining that the available storage space for the first aggregate is insufficient to store the namespace constituent volume and the first namespace mirror volume, migrating the first namespace mirror volume to a second aggregate.

13. A non-transitory computer-readable storage medium having stored thereon instructions comprising machine executable code which, when executed by at least one machine, causes the at least one machine to:
in response to an instruction for generating a snapshot for an expandable storage volume having a namespace constituent volume, multiple data constituent volumes, and a first namespace mirror volume, generate snapshots for a namespace constituent volume and multiple data constituent volumes of the expandable storage volume without generation of a snapshot for the first namespace mirror volume, wherein the namespace constituent volume stores metadata for data objects stored in the multiple data constituent volumes;
in response to an instruction for restoring the expandable storage volume, copy metadata in the snapshot of the namespace constituent volume to the namespace constituent volume of the expandable storage volume, and restore the data constituent volumes to the snapshots for the data constituent volumes; and
after copying metadata to the namespace constituent volume,
create a second namespace mirror volume as a backup for the namespace constituent volume;
back up the metadata of the namespace constituent volume into the second namespace mirror volume; and
determine whether to direct requests for metadata to the second namespace mirror volume based, at least in part, on a comparison of a frequency of access operations on the namespace constituent volume with a frequency of access operations on the second namespace mirror volume.

14. The non-transitory computer-readable storage medium of claim 13, wherein the namespace constituent volume includes inode files for data objects stored in the data constituent volumes, wherein the inode files include pointers to stub files, wherein each of the stub files maintain an object locator for identifying aggregates and storage nodes that store a data object of the data objects.

15. A device comprising:
a processor; and
a memory containing machine readable medium having stored thereon instructions which, when executed by the processor, cause the device to,
back up metadata of a namespace constituent volume into a first namespace mirror volume, wherein the namespace constituent volume stores the metadata for data objects stored in multiple data constituent volumes that are separate from the namespace constituent volume, wherein the first namespace mirror volume is separate from the namespace constituent volume and separate from the data constituent volumes;
determine to provide metadata indicated in a first metadata request from the namespace constituent volume for a first data object of the data objects based, at least in part, on a comparison of a frequency of access operations on the namespace constituent volume with a frequency of access operations on the first namespace mirror volume;
based on an indication that the namespace constituent volume is unavailable, redirect the first metadata requests to the first namespace mirror volume instead of the namespace constituent volume; and
provide metadata for the first data object from the first namespace mirror volume.

16. The device of claim 15, wherein an expandable storage volume includes the namespace constituent volume, the first namespace mirror volume, and the data constituent volumes, and each of the data constituent volumes is stored on a node of a plurality of nodes of a network storage cluster.

17. The device of claim 15, wherein the metadata for the data objects include pointers to stub files, wherein the stub files include object locators pointing to locations storing content of the data objects.

18. The device of claim 15, further comprising instructions which, when executed by the processor, cause the device to:

adjust a backup schedule based, at least in part, on a workload of the namespace constituent volume, wherein the metadata of the namespace constituent volume is backed up into the first namespace mirror volume according to the backup schedule.

19. The device of claim 15, wherein the instructions which, when executed by the processor, cause the device to back up the metadata of the namespace constituent volume into the first namespace mirror volume comprises instructions which, when executed by the processor, cause the device to, based on receipt of a request to write first metadata to the namespace constituent volume, writing the first metadata to the namespace constituent volume and the first namespace mirror volume.

20. The device of claim 15, further comprising instructions which, when executed by the processor, cause the device to:

monitor available storage space for a first aggregate, wherein the namespace constituent volume and the first namespace mirror volume are located on the first aggregate; and based on a determination that the available storage space for the first aggregate is insufficient to store the namespace constituent volume and the first namespace mirror volume, migrate the first namespace mirror volume to a second aggregate.

* * * * *